US010811148B2

United States Patent
Yi

(10) Patent No.: US 10,811,148 B2
(45) Date of Patent: Oct. 20, 2020

(54) SELF-DIAGNOSIS AND ACCIDENT-HANDLING UNMANNED NUCLEAR REACTOR

(71) Applicant: KOREA ATOMIC ENERGY RESEARCH INSTITUTE, Daejeon (KR)

(72) Inventor: Sung-Jae Yi, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 320 days.

(21) Appl. No.: 15/555,467

(22) PCT Filed: Apr. 15, 2016

(86) PCT No.: PCT/KR2016/003932
§ 371 (c)(1),
(2) Date: Sep. 1, 2017

(87) PCT Pub. No.: WO2016/167593
PCT Pub. Date: Oct. 20, 2016

(65) Prior Publication Data
US 2018/0061514 A1   Mar. 1, 2018

(30) Foreign Application Priority Data

Apr. 17, 2015  (KR) .................. 10-2015-0054557

(51) Int. Cl.
*G21C 15/18*   (2006.01)
*G21C 15/12*   (2006.01)

(52) U.S. Cl.
CPC ............. *G21C 15/18* (2013.01); *G21C 15/12* (2013.01); *Y02E 30/40* (2013.01)

(58) Field of Classification Search
CPC ................................ G21C 15/12; G21C 15/18
See application file for complete search history.

(56) References Cited

U.S. PATENT DOCUMENTS 5,149,492 A * 9/1992 Arai ................. G21C 15/18
                                              376/283
5,426,681 A * 6/1995 Aburomia ............ G21C 9/004
                                              376/283

(Continued)

FOREIGN PATENT DOCUMENTS

JP   H08184691 A    7/1996
JP   2001228280 A   8/2001
(Continued)

OTHER PUBLICATIONS

Smith, M. et al., "Westinghouse Small Modular Reactor Passive Safety System Response to Postulated Events," Proceedings of the 2012 International Congress on Advances in Nuclear Power Plants (ICAPP '12), Jun. 24, 2012, Chicago, Illinois, 6 pages.

(Continued)

*Primary Examiner* — Lily C Garner
(74) *Attorney, Agent, or Firm* — McCoy Russell LLP

(57) ABSTRACT

The application provides a self-diagnosis and accident-handling unmanned nuclear reactor, which: can passively cool down excessively generated heat without an operation of an operator when a malfunction of the nuclear reactor has occurred, wherein a cooling operation for safety measures can be carried out in a completely passive manner without a separate control command by a change in environmental conditions such as the structure and pressure of the nuclear reactor; and has a simpler structure compared to that of a conventional nuclear reactor safety system. It also provides a self-diagnosis and accident-handling unmanned nuclear reactor, which performs heat exchange by using a two-phase heat transfer mechanism, wherein heat exchange performance is maximized by introducing a spray-type heat exchanger having an optimized structure in which channels are three-dimensionally arranged, and can also easily and (Continued)

passively control heat exchange without a separate control means by using saturated steam pressure.

12 Claims, 7 Drawing Sheets

(56) References Cited

U.S. PATENT DOCUMENTS

| | | | |
|---|---|---|---|
| 8,824,619 | B2 | 9/2014 | Young et al. |
| 2002/0122526 | A1* | 9/2002 | Hidaka .................. G21C 15/18 376/283 |
| 2009/0129532 | A1* | 5/2009 | Reyes, Jr. ................ G21C 1/08 376/405 |
| 2013/0108003 | A1* | 5/2013 | Akazawa .............. F22B 35/004 376/211 |
| 2013/0336441 | A1 | 12/2013 | Cronje et al. |
| 2015/0001658 | A1 | 1/2015 | Wu et al. |

FOREIGN PATENT DOCUMENTS

| | | |
|---|---|---|
| JP | 2006138744 A | 6/2006 |
| JP | 2014181928 A | 9/2014 |
| JP | 2015509192 A | 3/2015 |
| KR | 20130129606 A | 11/2013 |
| KR | 101463440 B1 | 11/2014 |
| KR | 20140144573 A | 12/2014 |
| WO | 2013081148 A1 | 6/2013 |
| WO | 2013188128 A1 | 12/2013 |
| WO | 2014099101 A2 | 6/2014 |

OTHER PUBLICATIONS

Japan Patent Office, Office Action Issued in Application No. 2017552881, dated Aug. 29, 2018, 6 pages. (Submitted with Machine Translation).

European Patent Office, Extended European Search Report Issued in Application No. 16780316.2, dated Oct. 18, 2018, Germany, 11 pages.

ISA Korean Intellectual Property Office, International Search Report Issued in Application No. PCT/KR2016/003932, dated Jul. 18, 2016, WIPO, 4 pages.

* cited by examiner

US 10,811,148 B2

SELF-DIAGNOSIS AND ACCIDENT-HANDLING UNMANNED NUCLEAR REACTOR

CROSS-REFERENCE TO RELATED APPLICATIONS

The present application is a U.S. National Phase of International Patent Application Serial No. PCT/KR2016/003932, entitled "SELF-DIAGNOSIS AND ACCIDENT-HANDLING UNMANNED NUCLEAR REACTOR," filed on Apr. 15, 2016. International Patent Application Serial No. PCT/KR2016/003932 claims priority to Korean Patent Application No. 10-2015-0054557, filed on Apr. 17, 2015. The entire contents of each of the above-cited applications are hereby incorporated by reference in their entirety for all purposes.

TECHNICAL FIELD

The present invention relates to a self-diagnosis and accident-handling unmanned nuclear reactor, and more particularly, to a nuclear reactor having a cooling system which can passively cool down excessively generated heat without an operation of an operator when a malfunction of the nuclear reactor has occurred, wherein a cooling operation for safety measures can be carried out in a completely passive manner without a separate control command by means of a change in environmental conditions such as the structure and pressure of the nuclear reactor; and has a simpler structure compared to that of a conventional nuclear reactor safety system. Particularly, the present invention relates to a self-diagnosis and accident-handling unmanned nuclear reactor which can allow the cooling system to realize a faster heat exchange compared to a conventional heat exchanger and use a saturated steam pressure to passively perform a heat exchange control easily without any separate control means.

BACKGROUND ART

Nuclear power generation is made by a method for turning a turbine using energy generated at the time of nuclear fission to generate electric energy. FIG. 1 schematically illustrates a principle of typical nuclear power generation. An enormous amount of heat energy generated by the nuclear fission of nuclear fuel within a nuclear reactor vessel is transferred to a coolant in the nuclear reactor vessel, and the coolant is circulated to be discharged from the nuclear reactor vessel and to be reintroduced into the nuclear reactor vessel via a heat exchanger, as illustrated by a thick arrow in FIG. 1. The heat energy of the coolant is transferred to a steam generator while passing through the heat exchanger and water within the steam generator is phase-changed into high-temperature and high-pressure steam due to the heat energy. The so generated high-temperature and high-pressure steam is supplied to the turbine as illustrated by a thin arrow in FIG. 1, the turbine rotates by power of steam, a generator connected to the turbine rotates together, thereby generating power. The steam from which the energy is lost by the rotation of the turbine again goes through the phase change to be converted into water. As illustrated by the thin arrow in FIG. 1, the water is reintroduced into the steam generator and is thus circulated.

As described above, there is a risk that when accidents occur in the nuclear reactor in which the enormous amount of heat energy is generated and thus the nuclear reactor does not operate normally, big accidents such as the destruction of nuclear reactor facilities themselves due to the heat energy will be caused. Therefore, the nuclear reactor has to essentially include various safety systems to rapidly cool down the nuclear reactor in the event of damage to the nuclear reactor. These safety systems have a form in which a coolant is supplemented to each portion of the nuclear reactor and a form in which the coolant is circulated along an appropriate channel to absorb heat from each portion of the nuclear reactor and ultimately discard the absorbed heat to an external heat sink. At this time, since the coolant which has been in direct contact with each portion of the nuclear reactor contains dangerous radioactive materials to the environment, the safety systems need to be configured to discard only heat to the outside without directly discharge the coolant itself to the outside. In the nuclear reactor safety systems as described above, the heat exchanger for discarding heat to an external heat sink is generally referred to as a heat exchanger for removing residual heat in the technology field of the nuclear reactor.

The conventional heat exchanger for removing residual heat has a form as illustrated in FIG. 2 for simplicity. The conventional heat exchanger for removing residual heat as illustrated in FIG. 2 may be provided in a water tank 2 that has a pool form in which a channel 1 through which a high-temperature fluid flows has a coolant received therein and serves as a heat sink. With the above configuration, the heat exchanger for removing residual heat transfers heat from the high-temperature fluid flowing in the channel 1 to the coolant in the water tank 2, thereby cooling down the high-temperature fluid. In transferring the high-temperature fluid heat to the coolant around the channel 1, heat may be transferred by convection, and when the temperature of the high-temperature fluid is very high, the coolant around the channel 1 is boiled and thus heat may be transferred.

However, more rapid and efficient cooling is more and more required to remove the residual heat. As a result, those skilled in the art have steadily sought to further improve the heat exchange rate and the heat exchange efficiency of the conventional heat exchanger for removing residual heat. In addition, most of the conventional nuclear reactor safety systems are operated only after receiving a control command and therefore have inconveniences and dangerous factors in operation, and the conventional nuclear reactor safety system structure itself is very complicated and has a multiple form and thus has difficulty in constructing, operating, and controlling facilities. Accordingly, a need exists for the nuclear reactor safety system which may more improve the cooling efficiency than that of the conventional safety system, may be completely passively operated without performing the separate control operation of the operator, and may have a simpler structure than the conventional nuclear reactor safety system.

DISCLOSURE

Technical Problem

An object of the present invention is to provide a self-diagnosis and accident-handling unmanned nuclear reactor, which can passively cool down excessively generated heat without an operation of an operator when a malfunction of the nuclear reactor has occurred, wherein a cooling operation for safety measures can be carried out in a completely passive manner without a separate control command by means of a change in environmental conditions such as the structure and pressure of the nuclear reactor; and has a simpler structure compared to that of a conventional nuclear reactor safety system. Another object of the present invention is to provide a self-diagnosis and accident-handling unmanned nuclear reactor, which performs heat exchange by using a two-phase heat transfer mechanism, wherein heat exchange performance is maximized by introducing a spray-type heat exchanger having an optimized structure in which channels are three-dimensionally arranged, such that heat exchange can be effectively performed by two-phase heat transfer; and can also easily and passively control heat exchange without a separate control means by using saturated steam pressure.

Technical Solution

In one general aspect, a self-diagnosis and accident-handling unmanned nuclear reactor includes: a nuclear reactor driving system configured to include a nuclear reactor vessel accommodating a nuclear reactor core and a steam generator to which a steam pipe and a water supply pipe are connected; and a nuclear reactor safety system configured to be divided into an energy release space (ESR) that accommodates the nuclear reactor driving system, an energy absorbing space (EAS) that communicates with the energy release space through a passage formed thereover and accommodates a coolant, and an energy transfer space (ETS) that isolates from the energy release space and the energy absorbing space and has a residual heat removing portion connected to the nuclear reactor driving system and a flow path connected to the energy absorbing space provided therein to transfer heat released from the nuclear reactor driving system to the coolant and transfer the heat absorbed into the coolant to the outside to be discarded, such that the coolant in the nuclear reactor safety system is selectively distributed in response to the thermal hydraulic conditions changed depending on the change in pressure within the nuclear reactor driving system and whether the coolant is leaked to cool down the nuclear reactor driving system, in which the residual heat removing portion includes a heat exchange portion that transfers heat by a two-phase heat transfer mechanism using the coolant supplied by the flow path connected to the energy absorbing space, an airtight container portion that has the coolant and the heat exchange portion accommodated therein and has a lower part opened to distribute the coolant, and an outer cylinder portion that is provided to surround the airtight container portion to accommodate and distribute the coolant, and a space having a saturated stream pressure is formed at a position where the heat exchange portion is disposed in the airtight container portion by coolant stream which is generated by being boiled by the heat exchange portion.

In another general aspect, a self-diagnosis and accident-handling unmanned nuclear reactor includes: a nuclear reactor driving system configured to include a nuclear reactor vessel 152 accommodating a nuclear reactor core 151 and a steam generator 152 to which a steam pipe 154 and a water supply pipe 155 are connected; and a nuclear reactor safety system configured to include a first containment vessel 110 that accommodates gas and the nuclear reactor driving system in a first space V1 therein, a second containment vessel 120 that is disposed to be close to the first containment vessel 110 and has a horizontal barrier 125 provided therein to divide an inner space into a lower second space V2 and an upper third space V3 so as to accommodate the coolant in the second space V2, a containment vessel through pipe 111 that has one end disposed in the first space V1 and the other end communicating with the second space V2 and includes a containment vessel through valve 111v, a coolant injection pipe 112 that has one end disposed in the third space V3 and the other end communicating with the first space V1 and includes a coolant injection valve 112v, and a residual heat removing device 130 that is included in the third space V3 and connected to the nuclear reactor driving system to transfer heat released from the nuclear reactor driving system to the coolant and transfer the heat absorbed into the coolant to the outside, such that the coolant in the nuclear reactor safety system is selectively distributed in response to the thermal hydraulic conditions changed depending on the change in pressure within the nuclear reactor driving system and whether the coolant is leaked to cool down the nuclear reactor driving system, in which the residual heat removing device 130 includes a primary heat exchanger 131 that is connected to the nuclear reactor driving system to distribute the coolant in the nuclear reactor driving system to radiate heat, a secondary heat exchanger 132 that is disposed to be close to the primary heat exchanger 131 to distribute a coolant for absorbing residual heat to absorb the heat, a coolant spray pipe 133 that is connected to the second space V2 to spray the supplied coolant to the primary heat exchanger 131, a heat exchange vessel 134 that has an airtight container form in which the coolant is accommodated therein and has the primary heat exchanger 131 and the second heat exchanger 132 accommodated in an upper part thereof and has a coolant flow path 134a communicating with the second space V2 to distribute the coolant, and a heat exchange vessel outer cylinder 135 that surrounds the heat exchange vessel 134 to secure a water level of the coolant at which a lower end of the coolant flow path 134a is immersed in the coolant to accommodate and distribute the coolant, the coolant steam that is generated by being boiled by the primary heat exchanger 131 forms the space having the saturated steam pressure at the position where the primary heat exchanger 131 and the secondary heat exchanger 132 in the heat exchange vessel 134 are disposed, and the coolant supplied by the coolant spray pipe 133 on the space having the saturated steam pressure is sprayed to the primary heat exchanger 131 and the secondary heat exchanger 132 to take place the two-phase heat transfer mechanism.

In another general aspect, a method for operating the nuclear reactor includes: isolating that includes stopping a nuclear reactor driving system; and closing a steam pipe isolation valve 154a included in a steam pipe 154 and a water supply pipe isolation valve 155a included in a water supply pipe 155; circulating a primary heat exchanger that includes introducing steam generated by evaporating a coolant in the nuclear reactor driving system into the primary heat exchanger 131; and generating the coolant condensed by passing the steam introduced into the primary heat exchanger 131 through the primary heat exchanger 131 and re-introducing and circulating the generated coolant into the nuclear reactor vessel 152; forming a saturated steam pressure space that includes heating and boiling the coolant accommodated in the heat exchange vessel 134 by exchanging heat with the steam introduced into the primary heat exchanger 131; forming a space having a saturated steam pressure by collecting the steam generated by boiling the coolant around the primary heat exchanger 131 on an upper part of the heat exchange vessel 134; and expanding the space having the saturated steam pressure to a position where the primary heat exchanger 131 and the secondary heat exchanger 132 are disposed; performing a two-phase heat transfer that includes contacting a coolant supplied from a coolant spray pipe 133 to an outer surface of the primary heat exchanger 131 by spraying the coolant to the outer surface; evaporating the coolant contacting the outer surface of the primary heat exchanger 131 by allowing the coolant to absorb the heat from the steam in the primary heat exchanger 131; and generating the coolant by condensing the steam in the primary heat exchanger 131; contacting the steam generated by being evaporated on the outer surface of the primary heat exchanger 131 to an outer surface of the secondary heat exchanger 132; and condensing the steam contacting the outer surface of the secondary heat exchanger 132 as the coolant by releasing heat to the coolant in the secondary heat exchanger 132 and generating the steam by evaporating the coolant in the secondary heat exchanger 132; and removing residual heat that includes releasing the steam in the secondary heat exchanger 132 to the outside or introducing the steam into an external separate heat exchanger; re-introducing an external coolant into the secondary heat exchanger 132 or re-introducing and circulating the coolant generated by condensing steam in the external separate heat exchanger.

Advantageous Effects

According to the exemplary embodiment of the present invention, it is possible to exchange heat much faster than the conventional heat exchanger. More specifically, the three-dimensional heat exchanger according to the exemplary embodiment of the present invention can exchange heat using the two-phase heat transfer mechanism unlike the conventional heat exchanger that exchanges heat simply using the basic heat transfer principles such as the convection and the conduction, thereby realizing the heat exchange much faster than the conventional heat exchangers.

In addition, according to the exemplary embodiment of the present invention, the channel through which the high-temperature medium is distributed/the channel through which the low-temperature medium is distributed/the channel from which the coolant is sprayed are densely arranged three-dimensionally so that the heat exchange by the two-phase heat transfer can be more effectively made, thereby more improve the heat transfer efficiency as described above. That is, according to the exemplary embodiment of the present invention, the three-dimensional structure which can not only exchange heat simply using only the two-phase heat transfer principle but also improve the heat exchange efficiency is introduced into the heat exchanger structure, thereby maximizing the heat exchange rate and the heat exchange efficiency.

In particular, according to the exemplary embodiment of the present invention, the heat exchanger using the two-phase heat transfer is disposed in the sealed space filled with the coolant, such that the steam generated during the operation of the heat exchanger can be quickly and effectively condensed. Accordingly, it is possible to prevent the pressure in the heat exchange space and the pressure in the space connected thereto from excessively increasing due to the steam pressure of the coolant essentially generated during the two-phase heat transfer as described above. In addition, since the operation and stop of the heat exchanger and the control of the water level of the coolant naturally interoperate with each other by the structure itself, there is no need to separately control the operation and stop of the heat exchanger, or the like, thereby maximizing the convenience in the operation.

In addition, since the heat exchanger according to the exemplary embodiment of the present invention is much higher in the heat exchange rate and the heat exchange efficiency than the heat exchanger used for cooling down the conventional nuclear reactor, when the heat exchanger according to the exemplary embodiment of the present invention is applied for the cooling of the nuclear reactor, the cooling efficiency of the nuclear reactor can be greatly improved. In addition, since it is possible to prevent the pressure in the space in which the heat exchanger is accommodated from increasing as described above, when the heat exchanger according to the exemplary embodiment of the present invention is applied to the nuclear reactor safety system, it is possible to suppress the pressure in the nuclear reactor containment vessel from excessively increasing.

According to the exemplary embodiments of the present invention, the safety system completely passively performs the fast cooling without the separate control command at the time of the damage of the nuclear reactor, thereby minimizing the accident risk. First of all, the exemplary embodiment of the present invention may have the new structure based on the thermal hydraulic operation concept completely different from the conventional passive nuclear reactor safety system and variously perform the appropriate cooling operation to meet various accident conditions based on the new structure. In particular, the configuration of the nuclear reactor safety system according to the exemplary embodiment of the present invention has a much simpler structure than the typical nuclear reactor safety system, such that it is possible to much reduce the difficulty in designing and constructing the nuclear reactor than the conventional nuclear reactor and it is possible to improve the easiness and convenience beyond compare even in operating the constructed nuclear reactor. As a result, it is possible to greatly save the resources such as time, manpower, and costs consumed for the design, the construction, the operation, the control, etc.

Further, the configuration of the nuclear reactor safety system according to the exemplary embodiment of the present invention is different from that of the conventional nuclear reactor safety system and quickly absorbs the high-temperature energy of the nuclear reactor using the two-phase heat transfer scheme unlike the conventional nuclear reactor safety system to discard the high-temperature energy to the outside (heat sink such as sea water) so as to make the cooling speed remarkably fast, thereby greatly improving the absolute cooling ability. Further, the heat absorbed into the coolant acting as the heat sink is discarded to the outside, that is, the infinite heat sink once more, such that the residual heat removal time may be extended infinitely.

In addition, there is no substantially active control means (operated by receiving the control command issued by the operator from the outside) in performing the cooling operation and the general structure itself is much simpler, thereby more improving the convenience of manufacturing, operation, etc, than before. Further, the economical effect of saving the unnecessary energy waste during the operation may be achieved since the separate power source required for the active control or driving is not required. In addition, according to the exemplary embodiment of the present invention, the shape of the nuclear reactor is more simpler than before and (since the cooling ability is more excellent than before) the nuclear reactor may be installed in the space much smaller than the nuclear reactor including the conventional safety system, thereby much improving the operation and construction economic efficiency of the nuclear reactor.

[Detailed Description of Main Elements]

Figure 1:
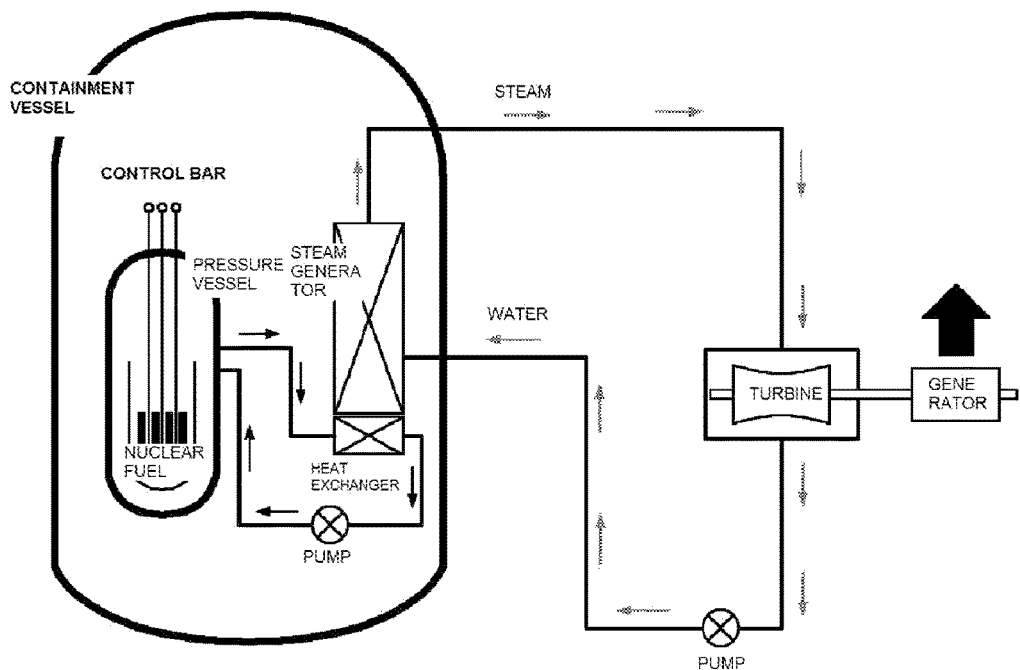
FIG. 1 is a diagram illustrating a typical nuclear power generation principle.

100: (The inventive) nuclear reactor
110: First containment vessel
111: Containment vessel through pipe, 111v: Containment vessel through valve
112: Coolant injection pipe 112v: Coolant injection valve
113: Steam release pipe 113v: Steam release valve
114: Steam bypass pipe 114v: Steam bypass valve
115: Containment vessel pressure reducing pipe, 115v: Containment vessel pressure reducing valve
115a: Containment vessel pressure reducing pipe heat exchanger
116: Auxiliary water supply pipe 116v: Auxiliary water supply valve
120: Second containment vessel 125: Horizontal barrier
130: Residual heat removing device
131: Primary heat exchanger 132: Secondary heat exchanger
131v: Auxiliary steam release valve 132a: Auxiliary secondary heat exchanger
133: Coolant spray pipe
134: Heat exchange vessel 134a: Coolant flow path
135: Heat exchange vessel outer cylinder 135v: Heat exchange vessel outer cylinder valve
136v1: First circulation valve 136v2: Second circulation valve
150: Nuclear reactor driving system 151: Nuclear reactor core
152: Nuclear reactor vessel 153: Steam generator
154: Steam pipe 154v: Steam pipe isolation valve
155: Water supply pipe 155v: Water supply pipe isolation valve
156: Coolant supplement pipe 157: Nuclear reactor vessel safe valve

BEST MODE

Hereinafter, a self-diagnostic and accident-handling unmanned nuclear reactor according to exemplary embodiments of the present invention having the above-mentioned configuration will be described in detail with reference to the accompanying drawings.

I. Conceptual Structure and Operation Principle of Nuclear Reactor

Figure 3:
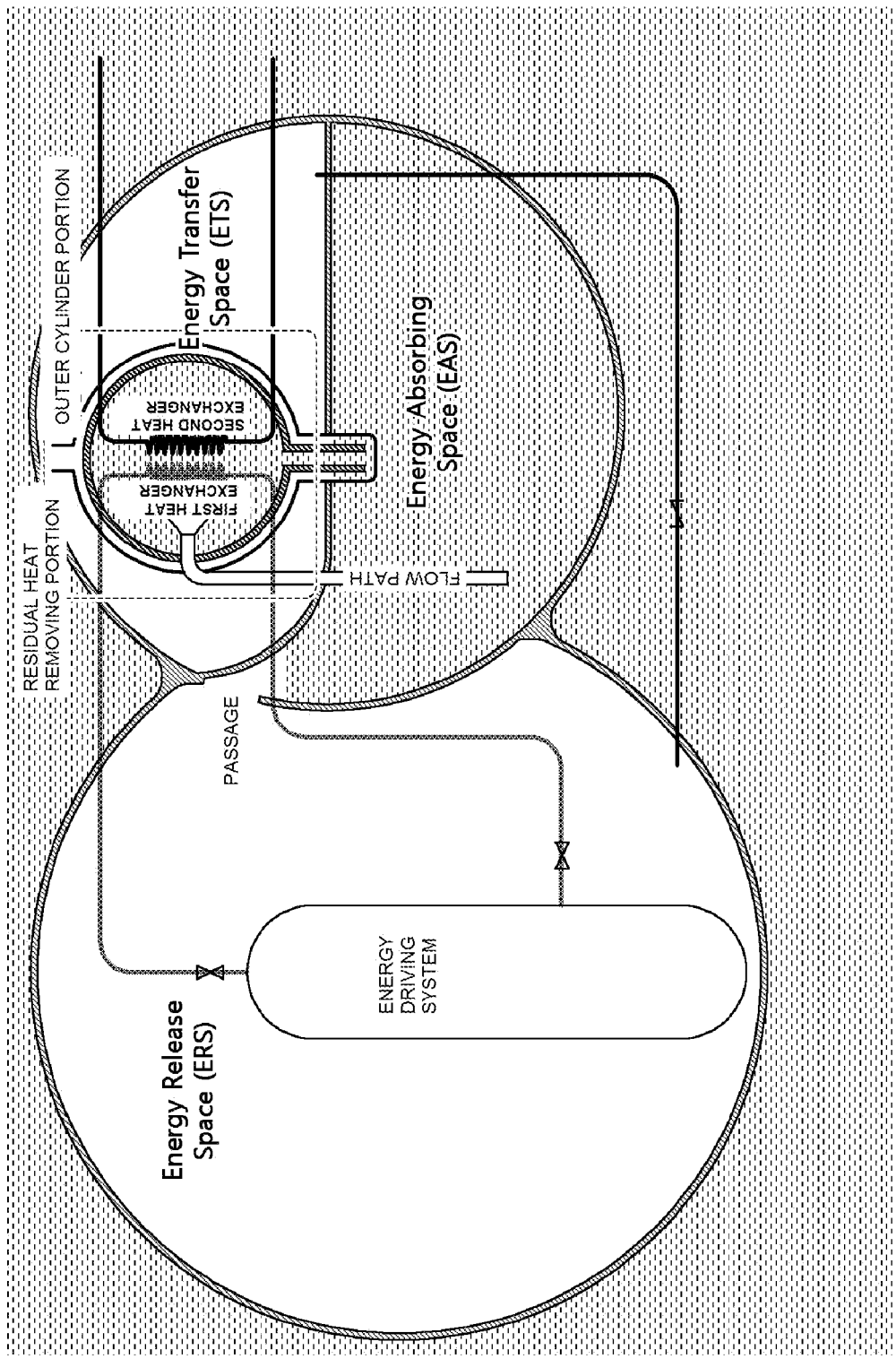
FIG. 3 is a conceptual diagram of a structure of a nuclear reactor according to an exemplary embodiment of the present invention.
Figure 4A:
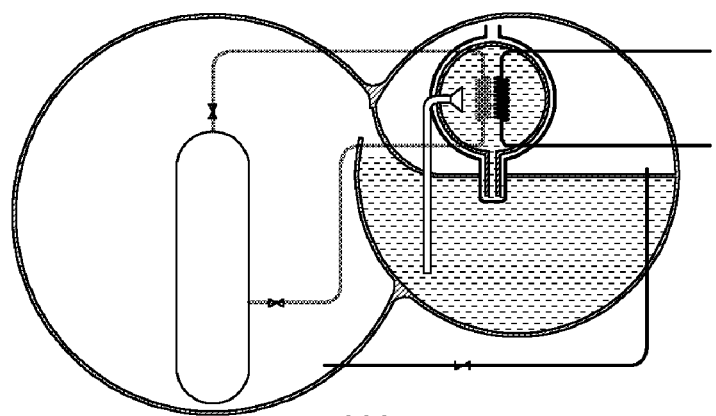
FIGS. 4A, 4B, and 4C are diagrams illustrating an operation principle of the nuclear reactor according to the exemplary embodiment of the present invention.
Figure 4B:
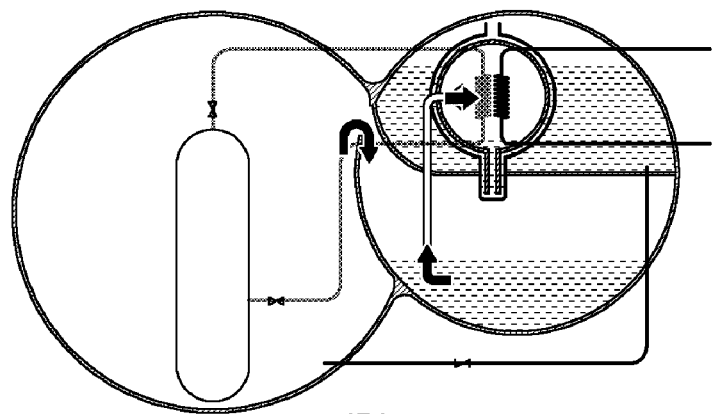
Figure 4C:
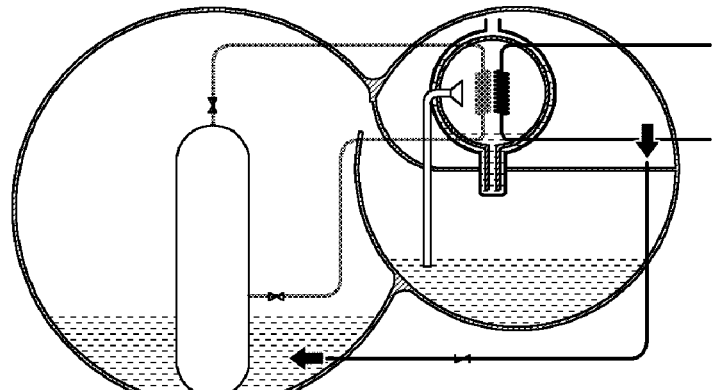

FIG. 3 is a conceptual diagram of a structure of a nuclear reactor according to an exemplary embodiment of the present invention and FIGS. 4A, 4B, and 4C are a diagram illustrating an operation principle of the conceptual nuclear reactor structure according to the exemplary embodiment of the present invention as illustrated in FIG. 3.

The nuclear reactor according to the exemplary embodiment of the present invention has a nuclear reactor safety system which may quickly and effectively perform cooling when a nuclear reactor driving system stops due to accidents, etc. Therefore, the nuclear reactor driving system in the nuclear reactor according to the exemplary embodiment of the present invention may be configured in any form.

Describing in detail, the nuclear reactor driving system may be a nuclear reactor driving system having a form which is generally used in a large nuclear reactor, that is, a form in which a nuclear reactor vessel accommodating a nuclear reactor core and a steam generator are separately provided while being spaced apart from each other or a form which is used in a small nuclear reactor, that is, a nuclear reactor driving system in which the steam generator is integrally accommodated in the nuclear reactor vessel. Whatever form the nuclear reactor driving system takes (that is, independent of the driving system for the large nuclear reactor or the small nuclear reactor), the nuclear reactor driving system basically includes the nuclear reactor vessel accommodating the nuclear reactor core and the steam generator to which a steam pipe and a water supply pipe are connected.

As illustrated in FIG. 3, the nuclear reactor safety system according to the exemplary embodiment of the present invention is largely divided into an energy release space (ERS), an energy absorbing space (EAS), and an energy transfer space (ETS). The energy release space (ERS) accommodates the nuclear reactor driving system and the energy absorbing space (EAS) accommodates a coolant. As illustrated, the energy absorbing space (EAS) is configured to communicate with the energy release space (ERS) by a passage which is formed thereover. Further, the energy transfer space (ETS) is configured to be isolated from the energy release space (ERS) and the energy absorbing space (EAS). An inside of the energy transfer space (ETS) is provided with a residual heat removing portion connected to the nuclear reactor driving system and a flow path connected to the energy absorbing space, such that the heat released from the nuclear reactor driving system may be transferred to the coolant and the heat absorbed into the coolant to the outside so that the absorbed heat may be transferred to the outside to be discarded.

The nuclear reactor safety system according to the exemplary embodiment of the present invention is configured to selectively distribute the coolant in the nuclear reactor safety system in response to thermal hydraulic conditions changed depending on a change in pressure within the nuclear reactor driving system and whether the coolant is leaked, thereby cooling down the nuclear reactor driving system. An operation principle of the conceptual configuration of the nuclear reactor according to the exemplary embodiment of the present invention will be described in more detail with reference to FIG. 4A, FIG. 4B, and FIG. 4C.

FIG. 4A is a diagram illustrating a normal state of the conceptual configuration of the nuclear reactor according to the exemplary embodiment of the present invention as illustrated in FIG. 3. When the nuclear reactor is normally operated, there is no need to additionally cool down the nuclear reactor, such that the nuclear reactor is maintained in the state of FIG. 4A. That is, in this case, the coolant does not move in the energy absorbing space (EAS) and the energy transfer space (ETS).

FIG. 4B illustrates the movement of the coolant in the state in which the nuclear reactor stops due to accidents, etc., and thus starts to release overheat. First, as illustrated in FIG. 4B, when the pressure within the energy release space (ERS) is increased due to the overheat of the nuclear reactor driving system (in this case, pressurization may be made only by air within the energy release space (ERS) or when the coolant is leaked in the nuclear reactor driving system, more pressurization may be made by steam generated by the evaporation of the leaked coolant), the coolant in the energy absorbing space (EAS) is pressurized through the passage formed over the energy release space (ERS). Therefore, as illustrated by an arrow, the coolant in the energy absorbing space (EAS) is supplied to the energy transfer space (ETS).

On the other hand, as described above, the energy transfer space (ETS) is provided with a residual heat removing portion and a flow path. As illustrated in FIG. 3, the residual heat removing portion may include a heat exchange portion for performing the heat transfer by the two-phase heat transfer mechanism using the coolant supplied by the flow path connected to the energy absorbing space and an airtight container portion having the coolant and the heat exchange portion accommodated therein and having a lower part opened to enable the coolant to be distributed. More specifically, the heat exchange portion may include a primary heat exchanger that is connected to the nuclear reactor driving system to distribute the coolant circulated through the nuclear reactor driving system and a secondary heat exchanger disposed to be close to the primary heat exchanger to absorb heat from the coolant distributed within the primary heat exchanger.

At this time, a space having a saturated steam pressure is formed at a position where the heat exchange portion is disposed in the airtight container portion by the steam of the coolant which is generated by being boiled by the heat exchange portion. More specifically, the space having the saturated steam pressure is formed at the position where the heat exchange portion is disposed in the airtight container portion by the steam of the coolant which is generated by being boiled by the primary heat exchanger, and the coolant supplied through the flow path connected to the energy absorbing space on the space having the saturated steam pressure is sprayed to the primary heat exchanger and the secondary heat exchanger to cause a two-phase heat transfer mechanism, such that the heat transfer by the two-phase heat transfer mechanism can be more effectively performed. (The two-phase heat transfer principle and the saturated steam pressure space formation will be described in more detail below). That is, in the case of FIG. 4B, indirect cooling of the nuclear reactor driving system is performed while the coolant moves from the energy absorbing space (EAS) to the energy transfer space (ETS).

FIG. 4C illustrates the movement of the coolant in the state in which overheat is more generated and thus sufficient cooling may not be made only by the indirect cooling as illustrated in FIG. 4B. As illustrated in FIG. 4B, if the cooling of the nuclear reactor driving system is continued to be performed while the coolant moves from the energy absorbing space (EAS) to the energy transfer space (ETS), a level of the coolant in the energy transfer space (ETS) continuously rises over time and a level of the coolant in the energy absorbing space (EAS) continuously falls. In this case, when the level of the coolant in the energy transfer space (ETS) rises beyond a certain level, the coolant in the energy transfer space (ETS) moves to the energy release space (ERS) as illustrated in FIG. 4C. The coolant moving to the energy release space (ERS) directly contacts the nuclear reactor driving system, such that the coolant may directly absorb heat from the nuclear reactor driving system. That is, in the case of FIG. 4C, the direct cooling of the nuclear reactor driving system is performed while the coolant moves from the energy transfer space (ETS) to the energy release space (ERS).

As described above, in the case of FIGS. 4B and 4C, the heat released from the nuclear reactor driving system is transferred to the coolant, such that the cooling of the nuclear reactor driving system may be performed. As such, according to the exemplary embodiment of the present invention, the cooling of the nuclear reactor driving system is performed by appropriately moving the coolant in the nuclear reactor safety system between the respective spaces depending on the thermal hydraulic conditions such as the change in pressure in the nuclear reactor driving system and whether the coolant is leaked, and the change in pressure in the respective spaces and the level of the coolant which are changed depending thereon.

Figure 5:
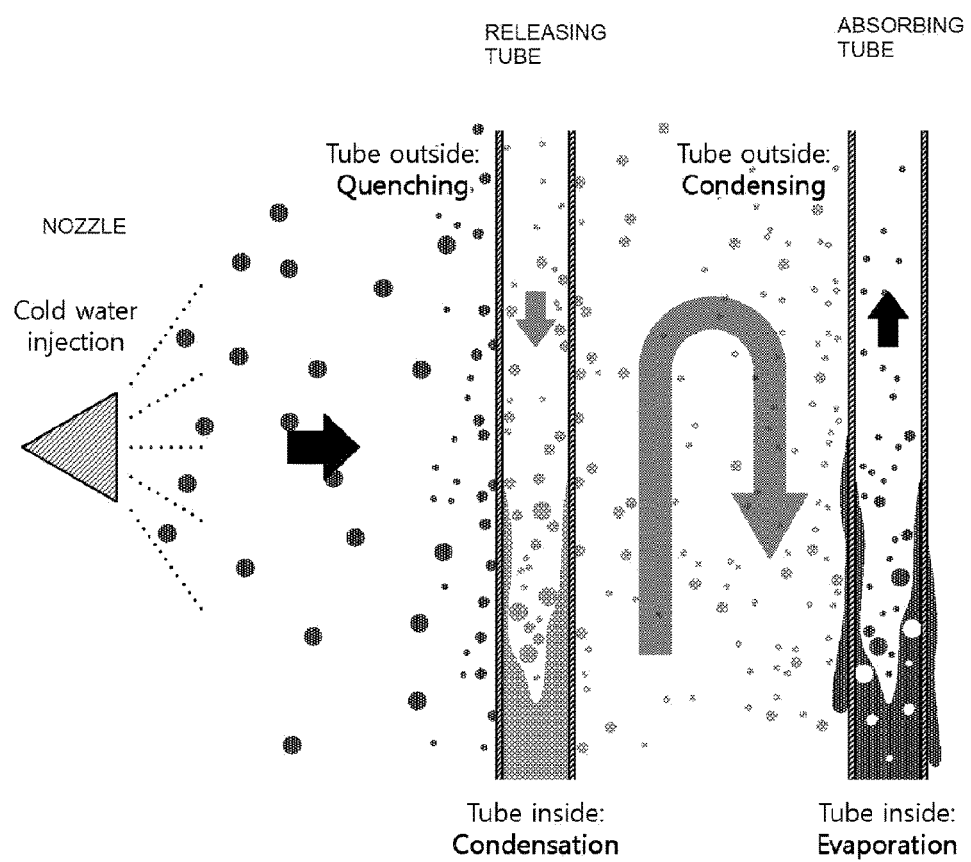
FIG. 5 is a diagram illustrating a two-phase heat transfer principle of the nuclear reactor according to the exemplary embodiment of the present invention.

II. Two-Phase Heat Transfer Principle and Saturated Steam Pressure Space Forming Principle Here, in the nuclear reactor according to the exemplary embodiment of the present invention, a heat transfer is performed using, in particular, a two-phase heat transfer mechanism. FIG. 5 is a diagram for describing a principle of the two-phase heat transfer mechanism which is used in the nuclear reactor according to the exemplary embodiment of the present invention.

A basic heat exchange principle in most of the existing heat exchangers is to pass a heat exchange medium through a channel isolated from the outside and directly exchange heat between a heat exchange medium in the channel and another heat exchange medium outside the channel, having a wall surface of the channel provided therebetween, thereby performing the heat transfer. That is, for example, an air cooling type heat exchanger form which is configured to make high-temperature cold water flow inside the channel and make low-temperature air flow outside the channel to allow the low-temperature air to absorb the heat of the high-temperature cold water has been most widely used. As another example, a heterogeneous heat exchanger form which is configured to make high-temperature oil flow in one side thereof and the low-temperature cold water flow in the other side thereof to allow the low-temperature cold water to absorb the heat of the high-temperature oil has been widely used as well. However, the heat exchange portion according to the exemplary embodiment of the present invention exchanges heat depending on a totally different principle therefrom.

As illustrated in FIG. 5, the heat exchange portion according to the exemplary embodiment of the present invention using the two-phase heat transfer mechanism basically includes three components, i.e., a releasing tube (left tube in FIG. 5) in which the high-temperature heat exchange medium flows, an absorbing tube (right tube in FIG. 5) in which the low-temperature heat exchange medium flows, and a nozzle through which other heat exchange media (cold water in FIG. 5 or other liquids) are sprayed to the two tubes.

The high-temperature heat exchange medium flows in the releasing tube and the low-temperature heat exchange medium flows in the absorbing tube. In the case of the existing heat exchanger, the two tubes adhere to each other to transfer heat from a high temperature side to a low temperature side through a wall surface of the tube. However, in the heat exchange portion according to the exemplary embodiment of the present invention using the two-phase heat transfer mechanism, unlike the configuration of the two tubes of the existing heat exchanger, the two tubes are spaced apart from each other at an appropriate interval.

The nozzle is provided at the releasing tube side to spray the cold water to the releasing tube. If the cold water is sprayed and water drops thereof approach or contact an outer surface of the releasing tube, the water drops of the cold water instantly absorb heat of the high-temperature heat exchange medium within the releasing tube and thus are quickly evaporated. That is, the water drops of the cold water quickly absorb a large amount of evaporation heat at the outer surface of the releasing tube and thus the rapid cooling phenomenon (tube outside: quenching) happens and the high-temperature heat exchange medium releases heat while taking its own heat away as the evaporation heat of the water drops inside the releasing tube and is cooled and thus the condensation phenomenon (tube inside: condensation) happens.

As described above, the cold water around the releasing tube is completely evaporated and becomes a steam state. The steam contacts the absorbing tube which is spaced apart from the releasing tube. In this case, since the low-temperature heat exchange medium flows in the absorbing tube, if the steam approaches or contacts the outer surface of the absorbing tube, the heat of the steam is instantly taken away to the low-temperature heat exchange medium within the absorbing tube and thus the steam is condensed, such that the steam is formed at the outer surface of the absorbing tube. That is, since the heat of the steam is taken away to the low-temperature heat exchange medium at the outer surface of the absorbing tube, the steam is condensed and thus becomes condensed water, such that tube outside condensing happens and the low-temperature heat exchange medium absorbs heat from the steam inside the absorbing tube, such that tube inside evaporation happens.

As such, in the two-phase heat transfer mechanism, the releasing tube and the absorbing tube are spaced apart from each other, the separate heat exchange medium (cold water in an example of FIG. 5) sprayed from the nozzle performs the heat transfer while being changed to gas phase—liquid phase in such a manner that the heat exchange medium is sprayed in a liquid phase, evaporated near the releasing tube to be in a gas phase, and condensed near the absorbing tube and again returns to the liquid phase. A research result of the two-phase heat transfer scheme to transfer heat even faster and more effectively than the existing heat transfer scheme has been published recently.

The safety system according to the exemplary embodiment of the present invention uses the two-phase heat transfer scheme to allow the coolant to absorb heat, thereby realizing the cooling faster and more efficiently than the existing nuclear reactor safety system.

Figure 6A:
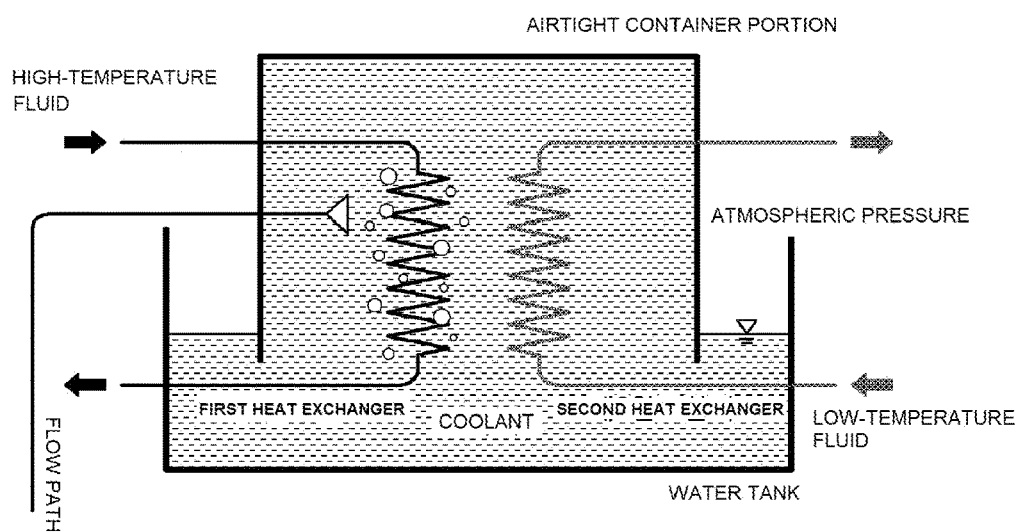
FIGS. 6A and 6B are diagrams illustrating a saturated steam pressure space forming principle of a nuclear reactor according to an exemplary embodiment of the present invention.
Figure 6B:
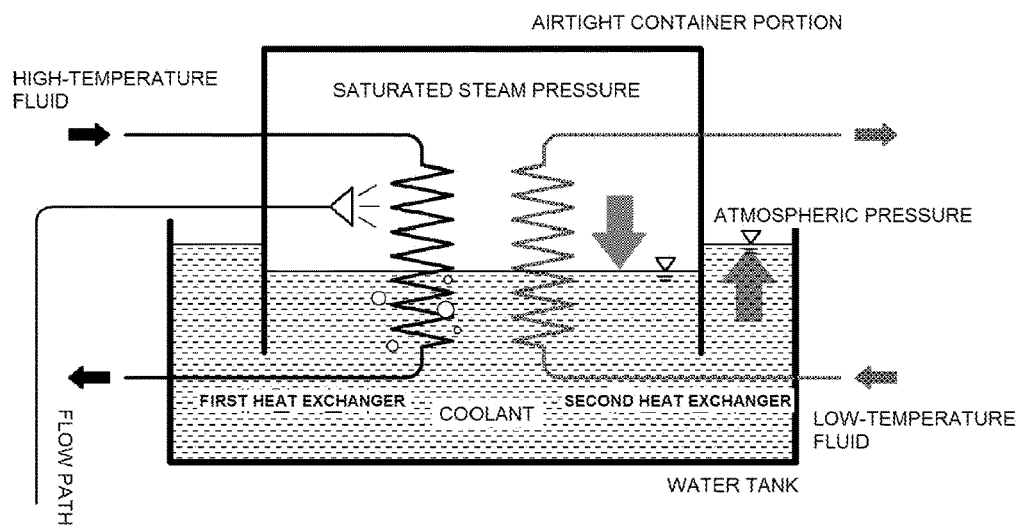

FIGS. 6A and 6B are diagrams illustrating a saturated steam pressure space forming principle of a nuclear reactor according to an exemplary embodiment of the present invention. FIG. 6A and FIG. 6B schematically illustrate the residual heat removing portion illustrated in FIG. 3. If the heat exchange portion provided in the residual heat removing portion of the present invention is compared with the conventional heat exchanger for removing residual heat illustrated in FIG. 2, there is a difference in that first, in addition to a channel (the primary heat exchanger in FIG. 6A and FIG. 6B) through which the high-temperature fluid is distributed, a channel (the secondary heat exchanger in FIG. 6A and FIG. 6B) through which the low-temperature fluid and a flow path are distributed are further provided, and second, a coolant accommodating structure having the path, through which the high-temperature fluid is distributed, accommodated therein.

Basically, the spray-type heat exchanger according to the exemplary embodiment of the present invention may be operated in the state as illustrated in FIG. 6A. The state of FIG. 6A corresponds to the state of FIG. 5A. If the high-temperature fluid is distributed in the primary heat exchanger in this state, similarly to the heat exchanger for removing residual heat illustrated in FIG. 2, heat is transferred to the coolant around the primary heat exchanger in which the high-temperature fluid is distributed to boil the coolant, thereby cooling down the high-temperature fluid.

Figure 2:
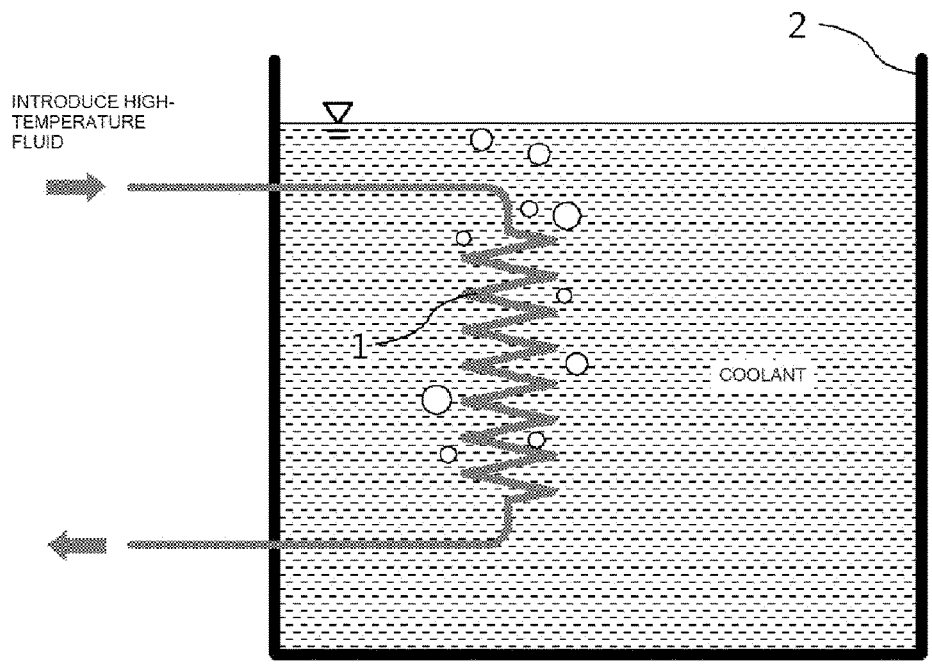
FIG. 2 is a diagram illustrating a configuration of the conventional heat exchanger for removing residual heat.

On the other hand, in the case of the conventional heat exchanger for removing residual heat, since a water tank in which the coolant is accommodated has a top-opened box form as illustrated in FIG. 2, when the coolant is boiled around the channel through which the high-temperature fluid is distributed, air bubbles rise to be spread to the atmosphere. However, the coolant accommodating structure according to the exemplary embodiment of the present invention is different from the conventional coolant accommodating structure. Describing in more detail, the coolant accommodating structure according to the exemplary embodiment of the present invention includes the airtight container portion and the water tank, wherein the airtight container portion having the primary heat exchanger, in which the high-temperature fluid is distributed, accommodated therein has a form in which a lower part thereof is open and an upper part thereof is closed and the water tank having the top-opened box form is provided on the lower part of the airtight container portion. That is, the airtight container portion is further provided in the water tank of the conventional heat exchanger for removing residual heat. At this time, as illustrated, the airtight container portion needs to be fully filled with the liquid-state coolant so that the airtight container portion does not have an empty space in an initial state.

If the coolant around the primary heat exchanger is boiled in this state (in the past, air bubbles rise toward the opened top part to be scattered to the atmosphere and lost), in the present invention, the upper part of the airtight container portion is closed, and therefore the air bubbles are collected on the upper part of the airtight container portion without being lost. If the generation of steam continues, the space filled with steam having a saturated steam pressure is provided on the upper part of the airtight container portion as illustrated in FIG. 6B (in other words, the state of FIG. 6B corresponds to that of FIG. 5B). The liquid-state coolant is pushed as much as the saturated steam pressure space is formed, that is, as indicated by the thin arrow in FIG. 6B, a water level in the airtight container portion drops and a water level between the airtight container portion and the water tank rises.

As such, in the state where the primary heat exchanger in which the high-temperature fluid is distributed, the secondary heat exchanger in which the low-temperature fluid is distributed, and the flow path through which the coolant is sprayed are accommodated in the space in which the steam formed by evaporating the coolant is full while having the saturated steam pressure, heat may be transferred from the high-temperature fluid in the primary heat exchanger to the low-temperature fluid in the secondary heat exchanger by the two-phase heat transfer mechanism.

Compared to FIG. 5 describing the principle of the two-phase heat transfer mechanism, the primary heat exchanger (high-temperature fluid distribution) in FIG. 6A and FIG. 6B correspond to the releasing tube in FIG. 5, the secondary heat exchanger (low-temperature fluid distribution) in FIG. 6 corresponds to the absorbing tube in FIG. 5, and the flow path in FIG. 6A and FIG. 6B correspond to the nozzle in FIG. 5. That is, in the structure illustrated in FIG. 6A and FIG. 6B, the heat transfer from the high-temperature fluid to the low-temperature fluid according to the above-described two-phase heat transfer principle can be made smoothly.

As described above, since the two-phase heat transfer is made by the evaporation heat and the condensation heat of the coolant, the efficiency is much higher than the heat transfer in the general fluid, that is, the convective heat transfer. That is, the two-phase heat transfer method can realize the heat transfer much faster and more effectively than the conventional heat transfer method.

Meanwhile, as described above, in the two-phase heat transfer used in the heat exchanger according to the exemplary embodiment of the present invention, the coolant sprayed from the flow path (corresponding to the nozzle in FIG. 5) is evaporated around the primary heat exchanger (corresponding to the releasing tube in FIG. 5) and the heat transfer is made by the phenomenon that the coolant is condensed around the secondary heat exchanger (corresponding to the absorbing tube in FIG. 5), such that it is advantageous that there is the amount of coolant steam around the primary heat exchanger and the secondary heat exchanger as much as possible. Conversely, the higher the ratio of non-condensed gases such as air around the primary heat exchanger and the secondary heat exchanger, the lower the two-phase heat transfer efficiency.

However, in the heat exchanger according to the exemplary embodiment of the present invention as illustrated in FIG. 6A and FIG. 6B, the space filled with gas, that is, the coolant steam due to the boiling of the coolant in the state in which no space filled with gas (state of FIG. 6A) is originally present is generated, such that the space becomes the space in which the coolant steam forms the saturated steam pressure and is full. In other words, in the state of FIG. 6B, a ratio of the non-condensed gas is minimized around the primary heat exchanger and the secondary heat exchanger in the space above the water level of the liquid-state coolant in the airtight container portion, such that the two-phase heat transfer efficiency in the state of FIG. 6B is maximized.

In short, in the present invention,
  As the state illustrated in FIG. 6A, that is, the state in which the primary heat exchanger in which the high-temperature fluid is distributed is completely immersed in the coolant, at this time, the high-temperature fluid is cooled down by the boiling of the coolant (similar to the conventional heat exchanger for removing residual heat).
  If the boiling of the coolant continues, the coolant steam is filled in the space above the airtight container portion, and the space filled with the coolant steam having the saturated steam pressure is formed as illustrated in FIG. 6B. At this time, in the space filled with the coolant steam, the high-temperature fluid is cooled down by the two-phase heat transfer between the primary heat exchanger and the secondary heat exchanger. In addition, a part of the lower part of the primary heat exchanger may be immersed in the liquid-state coolant. Here, the high-temperature fluid is cooled down by the boiling of the coolant on the same principle as in FIG. 6A.

That is, unlike the conventional heat exchanger for removing residual heat, which simply uses the boiling of the coolant for cooling down the high-temperature fluid, according to the exemplary embodiment of the present invention, the boiling of the coolant is still used in the part immersed in the liquid-state coolant, and the cooling is performed using the two-phase heat transfer in a part exposed to the steam, thereby realizing the cooling efficiency and rate much higher than before. In addition, due to the structural characteristics of the residual heat removing portion of the present invention, since the space in which the two-phase heat transfer takes place is filled with the coolant stem in the state where the coolant steam is saturated, the non-condensed gas (air, etc.) is mixed in the space in which the two-phase heat transfer takes place, such that the causes of the adverse effect of reducing the heat transfer efficiency are originally removed. As a result, the two-phase heat transfer efficiency can be increased to the maximum possible.

III. Specific Structure and Operating Method of Nuclear Reactor

Figure 7:
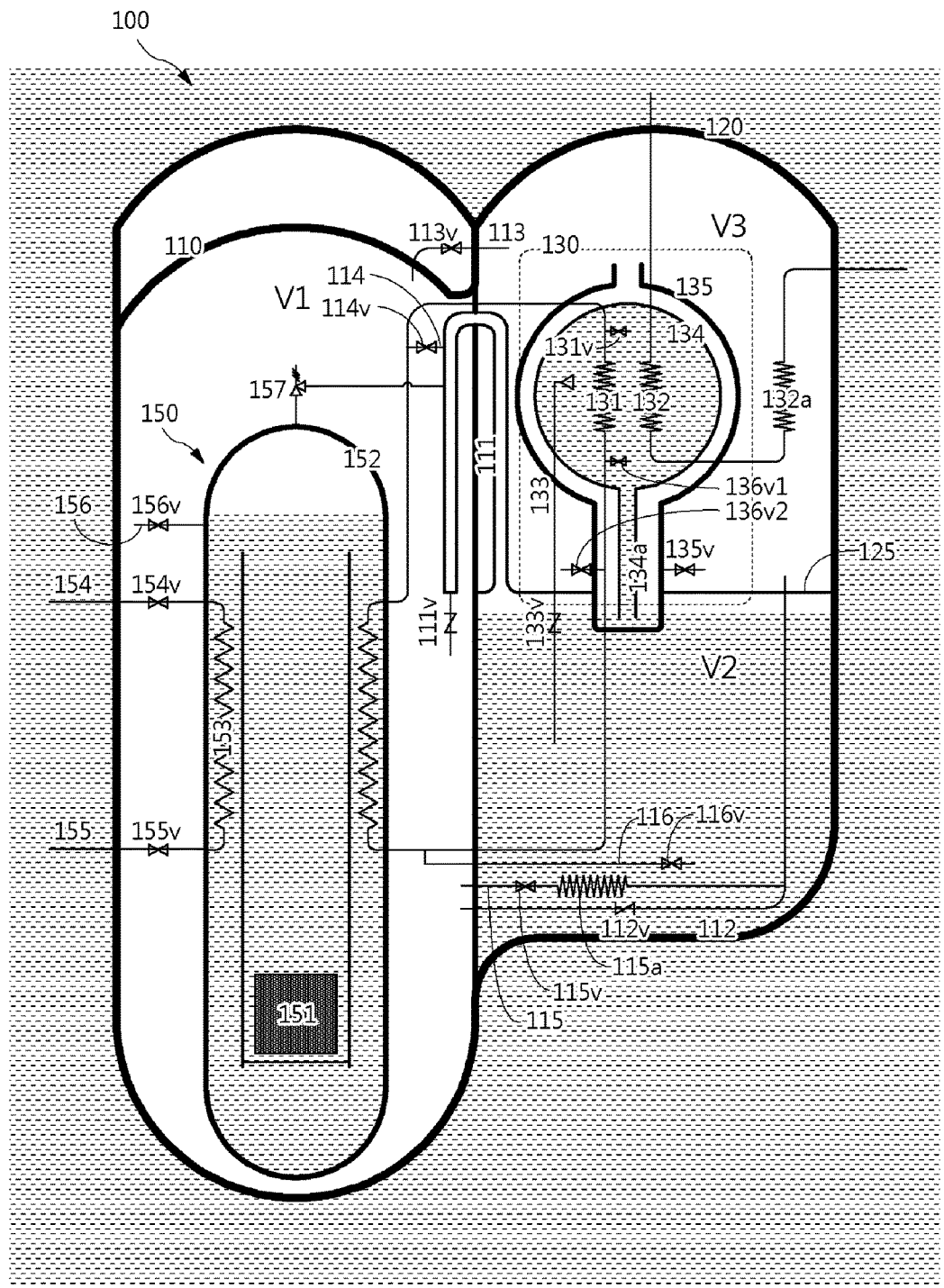
FIG. 7 is a diagram illustrating the nuclear reactor according to the exemplary embodiment of the present invention.

The conceptual construction and principle of the nuclear reactor of the present invention have been described above with reference to FIGS. 3 and 4 (see item I), and the principal principles used in the nuclear reactor of the present invention, namely, the two-phase heat transfer principle and the saturated steam pressure space forming principle have been described with reference to FIGS. 5 and 6 (see item II). Hereinafter, the nuclear reactor according to the exemplary embodiment of the present invention will be described as a more specific and detailed embodiment. FIG. 7 illustrates the nuclear reactor according to the exemplary embodiment of the present invention. In FIG. 7, the nuclear reactor according to the exemplary embodiment of the present invention also includes the nuclear reactor driving system and the nuclear reactor safety system.

[Nuclear Reactor Driving System]

The nuclear reactor driving system is configured to include a nuclear reactor vessel 152 accommodating a nuclear reactor core 151 and a steam generator 153 to which a steam pipe 154 and a water supply pipe 155 are connected. As described above, the steam generator may be integrally formed within the nuclear reactor vessel or the steam generator may be provided outside the nuclear reactor vessel. Therefore, the nuclear reactor driving system is not limited to the illustrated form but may be formed in any form. An operation of each part of the nuclear reactor driving system will be described below in more detail.

The nuclear reactor core 151 is a core portion of the nuclear reactor and is a part of causing the nuclear fission in which an atomic nucleus of nuclear fuel is split into two by being combined with a neutron to generate heat energy. That is, generally, the nuclear reactor core 151 is called a bundle of fuel rods which is nuclear fuel of the reactor. Further, generally, the nuclear reactor core 151 includes a nuclear reactor output control rod, in which the nuclear reactor output control rod is vertically movably inserted into the nuclear reactor core 151 to control how much the nuclear fission of the nuclear fuel is made depending on the inserted degree of the nuclear reactor output control rod, and thus acts to control the output of the nuclear reactor 100.

The nuclear reactor vessel 152 accommodates the nuclear reactor core 151 while being sealed off from the outside. As described above, since the nuclear reactor output control rod needs to be controlled to vertically move, a portion of the upper end of the nuclear reactor output control rod is generally provided to be exposed outside the nuclear reactor vessel 152. In this respect, the nuclear reactor core 151 is naturally disposed under the nuclear reactor vessel 152. At this time, the coolant is accommodated in the reactor vessel 152 and thus the heat energy generated from the reactor core 151 is absorbed into the coolant. The coolant absorbs the heat energy generated from the nuclear reactor core 151 to act to cool the nuclear reactor core 151 and transfers the heat absorbed by the coolant to the outside, thereby generating power (hereinafter, which will be described below in more detail in the steam generator 153). As the coolant, cold water, that is, water is generally used, which will be described below in more detail. The heat exchange media distributed in each part may be mixed due to the opening of a circulation channel which is in a closed state at ordinary times, etc., when the nuclear reactor safety system is operated, and therefore the heat exchange medium or the coolant which is used in each of all parts of the nuclear reactor is generally used steadily as the cold water.

The steam generator 153 is formed in the heat exchanger form and is provided inside the nuclear reactor vessel 152. The coolant operated as the heat exchange medium is distributed inside the steam generator 153 and the steam generator 153 is supplied with heat from the coolant inside the nuclear reactor vessel 152 around the steam generator 153. Therefore, the coolant distributed inside the steam generator 153 absorbs heat and the evaporation happens. As such, the coolant which is in the high-temperature, high-pressure gas phase is discharged to the steam pipe 154 to operate a turbine. After the turbine is operated, the condensed coolant is again supplied to the steam generator 153 through the water supply pipe 155 and thus is circulated. The steam pipe 154 and the water supply pipe 155 are each provided with a steam pipe isolation valve 154a and a water supply pipe isolation valve 155a and thus are blocked from the outside at the time of an emergency situation.

As such, when the nuclear reactor is normally operated, the coolant inside the nuclear reactor vessel 152 is naturally circulated. This will be described below in more detail. When the heat energy generated from the nuclear reactor core 151 is absorbed into the coolant, the high-temperature coolant rises. When the high-temperature coolant reaches the steam generator 153 which is disposed over the nuclear reactor core 151, the coolant in the steam generator 153 and the high-temperature coolant exchange heat with each other. That is, the coolant in the steam generator 153 absorbs heat from the high-temperature coolant. Therefore, the high-temperature coolant has the reduced temperature while passing through the steam generator 153 and thus falls. The so falling coolant again absorbs the heat energy generated from the nuclear reactor core 151 again, such that the natural circulation convection is made.

The foregoing nuclear reactor driving system may be commonly included in the existing large or small (integrated) reactor. The driving system configured as described above is operated and thus the nuclear reactor produces power. When the nuclear reactor is normally operated, the operation of the nuclear reactor has no problem only by the driving system. However, if the nuclear reactor vessel 152 is damaged and thus the coolant in the nuclear reactor vessel 152 is leaked, the heat energy generated from the nuclear reactor core 151 may not be absorbed into a sufficient amount of coolant. Therefore, the temperature around the nuclear reactor core 151 excessively rises and thus more serious damage such as melting of parts may occur. The nuclear reactor has a great effect on environment such as radioactivity leakage and therefore safety is important above all. Therefore, if the coolant is leaked due to the damage of the nuclear reactor vessel 152, a safety system to quickly cool the nuclear reactor vessel 152, etc., is essential.

As described above, if the safety system is operated only when receiving a separate control command such as an operator's manipulation, when the operator of the nuclear reactor does not issue a command in time at the time of the occurrence of accidents due to the problems that he/she is absent, wounded, or the like, the danger of the accident is terribly increased. Further, even in the case of the system which is automatically controlled by an electron control, etc., when the safety system is damaged due to the hot heat generated due to the damage of the nuclear reactor, the safety system may not be correctly operated. Therefore, when the nuclear reactor is damaged and the coolant is leaked, a passive safety system which is mechanically operated upon the change in physical environment is necessarily provided. Further, many studies on the passive safety system have been conducted in the past. However, the existing passive safety system has the following problems.

First, since the existing passive safety systems have a considerably large volume, there are many restrictions in construction and economy. As a result, considerable resources such as time and manpower are consumed to design the safety systems for overcoming the above problems. In particular, in the case of the small nuclear reactor of which the demand has been gradually expanded recently, if the existing passive safety system is applied to the small reactor, the small nuclear reactor may not obtain the sufficient cooling efficiency and thus the difficulty in designing the small nuclear reactor may be increased. Therefore, resources such as a space, a material, and costs may be more wasted during the actual construction of the nuclear reactor and resources such as time, manpower, and costs consumed for maintenance, etc., cannot but be more wasted even during the operation of the constructed nuclear reactor.

To solve the above problems, the exemplary embodiment of the present invention may appropriately cope with the various occurrence situations of accidents of nuclear reactors using one system and may configure the safety systems (that is, devices for cooling a nuclear reactor) in completely passive type and thus there is no need for the separate control command of the operator. As a result, the fast cooling may be made when the nuclear reactor is damaged. In particular, unlike the existing nuclear reactor, the nuclear reactor according to the exemplary embodiment of the present invention mostly uses the two-phase heat transfer scheme to perform the cooling and performs the cooling while the coolant appropriately moves within the containment vessel divided into several spaces at the time of the occurrence of accidents to perform the faster and more efficient cooling than before. In addition, the safety system according to the exemplary embodiment of the present invention has a configuration much simpler than that of the existing passive safety system to greatly reduce the volume of the nuclear reactor, such that it is very suitable for the small nuclear reactor of which the demand has been gradually expanded recently.

[Nuclear Reactor Safety System]

In the exemplary embodiment of FIG. 7, the nuclear reactor safety system largely includes a first containment vessel 110 and a second containment vessel 120, and further includes a containment vessel through tube 111 for the purpose of movement of the coolant, a coolant injection pipe 112, or the like, and a residual heat removing device 130 for removing residual heat is provided.

A first space V1 inside the first containment vessel (110) accommodates gases and the nuclear reactor driving system. That is, the space in the first containment vessel 110, that is, the first space V1 corresponds to the energy release space ERS in the conceptual structure (see item I of FIG. 3) of the nuclear reactor of the present invention described above.

The second containment vessel 120 is disposed in close contact with the first containment vessel 110 and has a horizontal barrier 125 provided therein so that the inner space thereof is divided into a lower second space V2 and an upper third space V3 to accommodate the coolant in the second space V2. At this time, the second space V2 of the lower part of the second containment vessel 120 corresponds to the energy absorbing space EAS in the conceptual structure (see item I of FIG. 3) of the nuclear reactor according to the exemplary embodiment of the present invention described above. Further, the third space V3 of the upper part of the second containment vessel 120 corresponds to the energy transfer space ETS in the conceptual structure (see item I of FIG. 3) of the nuclear reactor according to the exemplary embodiment of the present invention described above.

As such, the first containment vessel 110 and the second containment vessel 120 configuring the nuclear reactor safety system have the energy release space (ERS), the energy absorbing space (EAS), and the energy transfer space (ETS) provided therein and selectively distributes the coolant in the nuclear reactor safety system in response to the thermal hydraulic condition changed in response to the change in pressure in the nuclear reactor driving system and whether the coolant is leaked, thereby cooling down the nuclear reactor driving system. At this time, a plurality of passages are provided so that the coolant in the nuclear reactor safety system can be smoothly distributed to the respective spaces. Most basically, the containment vessel through pipe 111 and the coolant injection pipe 112 are provided.

One end of the containment vessel through pipe 111 is disposed in the first space V1 and the other end thereof communicates with the second space V2 and the containment vessel through pipe 111 includes a containment vessel through valve 111v. The containment vessel through pipe 111 corresponds to a passage in the conceptual structure (see item I of FIG. 3) of the nuclear reactor according to the exemplary embodiment of the present invention described above. Meanwhile, one end of the coolant injection pipe 112 is disposed in the third space V3 and the other end thereof communicates with the first space V1 and the coolant injection pipe 112 includes a coolant injection valve 112v.

The movement of the coolant or the steam between the first space V1 and the second space V2 by the containment vessel through pipe 111 moves the coolant or the steam between the third space V3 and the first space V1 by the coolant injection pipe 112. (Meanwhile, as will be described in detail later, the movement of the coolant between the second space V2 and the third space V3 is made by the coolant spray pipe 133). At this time, the movement of the coolant or the steam is naturally made by the state (liquid state/gas state) of the coolant in the first, second, and third spaces V1, V2, and V3, a pressure difference, a water head difference, or the like without requiring the active operation of the separate control device. That is, the operation of selectively distributing the coolant in the nuclear reactor safety system in response to the thermal hydraulic conditions changed depending on the change in pressure within the nuclear reactor driving system and whether the coolant is leaked to cool down the nuclear reactor driving system is naturally realized.

The residual heat removing device 130 is provided in the third space V3 and is connected to the nuclear reactor driving system to transfer the heat released from the nuclear reactor driving system to the coolant and transfer the heat absorbed into the coolant to the outside. Describing the configuration of the residual heat removing device 130 in more detail, the residual heat removing device 130 includes a heat exchange vessel 134 that includes a primary heat exchanger 131, a secondary heat exchanger 132, a coolant spray pipe 133, and a coolant flow path 134a and a heat exchange vessel outer cylinder 135.

The primary heat exchanger 131 is connected to the nuclear reactor driving system to distribute the coolant in the nuclear reactor driving system, thereby dissipating heat. At this time, the primary heat exchanger 131 corresponds to the primary heat exchanger or the releasing tube in the conceptual structure (see item I of FIGS. 3 and 4) of the nuclear reactor according to the exemplary embodiment of the present invention and the main principles (see item II of FIGS. 5 and 6) of the present invention described above.

The secondary heat exchanger 132 is disposed to be close to the primary heat exchanger 131 and distributes the residual heat absorbing coolant to absorb heat. At this time, the secondary heat exchanger 132 corresponds to the secondary heat exchanger or the absorbing tube in the conceptual structure (see item I of FIGS. 3 and 4) of the nuclear reactor according to the exemplary embodiment of the present invention and the main principles (see item II of FIGS. 5 and 6) of the present invention described above.

The coolant spray pipe 133 is connected to the second space V2 and sprays the supplied coolant to the primary heat exchanger 131. At this time, the coolant spray pipe 133 corresponds to the flow path or the nozzle in the conceptual structure (see item I of FIGS. 3 and 4A, 4B, and 4C) of the nuclear reactor according to the exemplary embodiment of the present invention and the main principles (see item II of FIGS. 5, 6A and 6B) of the present invention described above.

The heat exchange vessel 134 has the airtight container form in which a coolant is accommodated. An upper part of the heat exchange vessel 134 is provided with the primary heat exchanger 131 and the secondary heat exchanger 132 and a lower part thereof is provided with the coolant flow path 134a communicating with the second space V2 and having the coolant distributed therethrough. At this time, the coolant spray pipe 133 corresponds to the airtight container portion in the conceptual structure (see item I of FIGS. 3 and 4A, 4B, and 4C) of the nuclear reactor according to the exemplary embodiment of the present invention and the main principles (see item II of FIG. 6A and FIG. 6B) of the present invention described above.

The heat exchange vessel outer cylinder 135 is provided to surround the heat exchange vessel 134 to secure the water level of the coolant at which the lower end of the coolant flow path 134a is immersed in the coolant, and thus is configured to accommodate and distribute the coolant. At this time, the heat exchange vessel outer cylinder 135 corresponds to the water tank in the main principles (see item II of FIG. 6) of the present invention described above. However, the water tank illustrated in FIG. 6A and FIG. 6B merely serves to accommodate the coolant, but the heat exchange vessel outer cylinder 135 serves to more smoothly control the water level of the coolant due to the shape features.

A structure of the heat exchange vessel outer cylinder 135 will be described in more detail as follows. The heat exchange vessel outer cylinder 135 basically has a shape corresponding to the heat exchange vessel 134 and is formed to surround the heat exchange vessel 134. More specifically, the heat exchange vessel outer cylinder 135 is formed to be larger than the heat exchange vessel 134 so that an inner wall of the heat exchange vessel outer cylinder 135 and an outer wall of the heat exchange vessel 134 are spaced apart from each other at a predetermined interval. In addition, the heat exchange vessel outer cylinder 135 has the upper part opened and the lower part closed so that the coolant is distributed to the upper part.

As such, the heat exchange vessel outer cylinder 135 surrounds the heat exchange vessel 134, such that the coolant discharged from the heat exchange vessel 134 is first filled in the space between the outer wall of the heat exchange vessel 134 and the inner wall of the heat exchange vessel outer cylinder 135. At this time, since the lower part of the heat exchange vessel outer cylinder 135 is closed, the coolant may not exit from the space before the level of the coolant filled in the space rises to the opened upper part of the heat exchange vessel outer cylinder 135. That is, as the saturated steam pressure space is formed in the heat exchange vessel 134, the coolant discharged from the heat exchange vessel 134 is filled in the space between the outer wall of the heat exchange vessel 134 and the inner wall of the heat exchange vessel outer cylinder 135 just as it is to secure the appropriate water level of the coolant so that the water head difference from the water level of the coolant in the heat exchange vessel 134 is not so large.

If the heat exchange vessel outer cylinder 135 is not provided, the coolant discharged from the heat exchange vessel 134 spreads into the third space V3, such that it is difficult to make the water level of the coolant high. A structure such as a vertical barrier may be formed on the lower part of the heat exchange vessel 134 to partially partition the space in the third space V3. Even in this case, in consideration of the volume of the third space V3, since the absolute amount of the coolant discharged from the heat exchange vessel 134 is considerably insufficient, it is apparent that the water head difference between the water level of the coolant flowing out released from the third space V3 and the water level of the coolant in the heat exchange vessel 134 is considerably large. However, if the spaces having the large water head difference communicate with each other, the pressure difference between the respective spaces has to be very large so that the water head difference can be maintained. That is, the process of discharging the coolant by the pressure at which the saturated steam pressure space is formed within the heat exchange vessel 134 may not be smoothly performed in the environment that the water head difference is large.

However, when the heat exchange vessel outer cylinder 135 is provided, the coolant discharged from the heat exchange vessel 134 is preferentially filled in the space between the heat exchange vessel 134 and the heat exchange vessel outer cylinder 135. Here, since the volume of the space itself is not so large (relatively as compared to the case where the coolant is discharged to the third space V3), a much higher water level can be easily achieved even by a much less coolant. That is, the water level of the coolant in the heat exchange vessel 134 and the water level of the coolant in the space between the heat exchange vessel 134 and the heat exchange vessel outer cylinder 135 may be balanced with the relatively much less water head difference. Therefore, the formation of the saturated steam pressure space and the discharge of the coolant in the heat exchange vessel 134 can be made more stably and smoothly.

That is, in the nuclear reactor of the present invention as described in the conceptual structure of the nuclear reactor according to the exemplary embodiment of the present invention (see item I of FIGS. 3 and 4) and the main principles of the present invention (see item II of FIGS. 5 and 6) described above, The coolant steam that is generated by being boiled by the primary heat exchanger 131 forms the space having the saturated steam pressure at the position where the primary heat exchanger 131 and the secondary heat exchanger 132 in the heat exchange vessel 134 are disposed.

The coolant supplied by the coolant spray pipe 133 on the space having the saturated steam pressure is sprayed to the primary heat exchanger 131 and the secondary heat exchanger 132 to take place the two-phase heat transfer mechanism.

Accordingly, as described above, the two-phase heat transfer principle can realize much faster and more effective cooling than the existing nuclear reactor safety system, and the two-phase heat transfer phenomenon is always made in the saturated steam pressure space, thereby maximizing the two-phase heat transfer efficiency to the maximum possible.

[Method for Operating Nuclear Reactor Safety System]

Figures 8A, 8B, 8C:
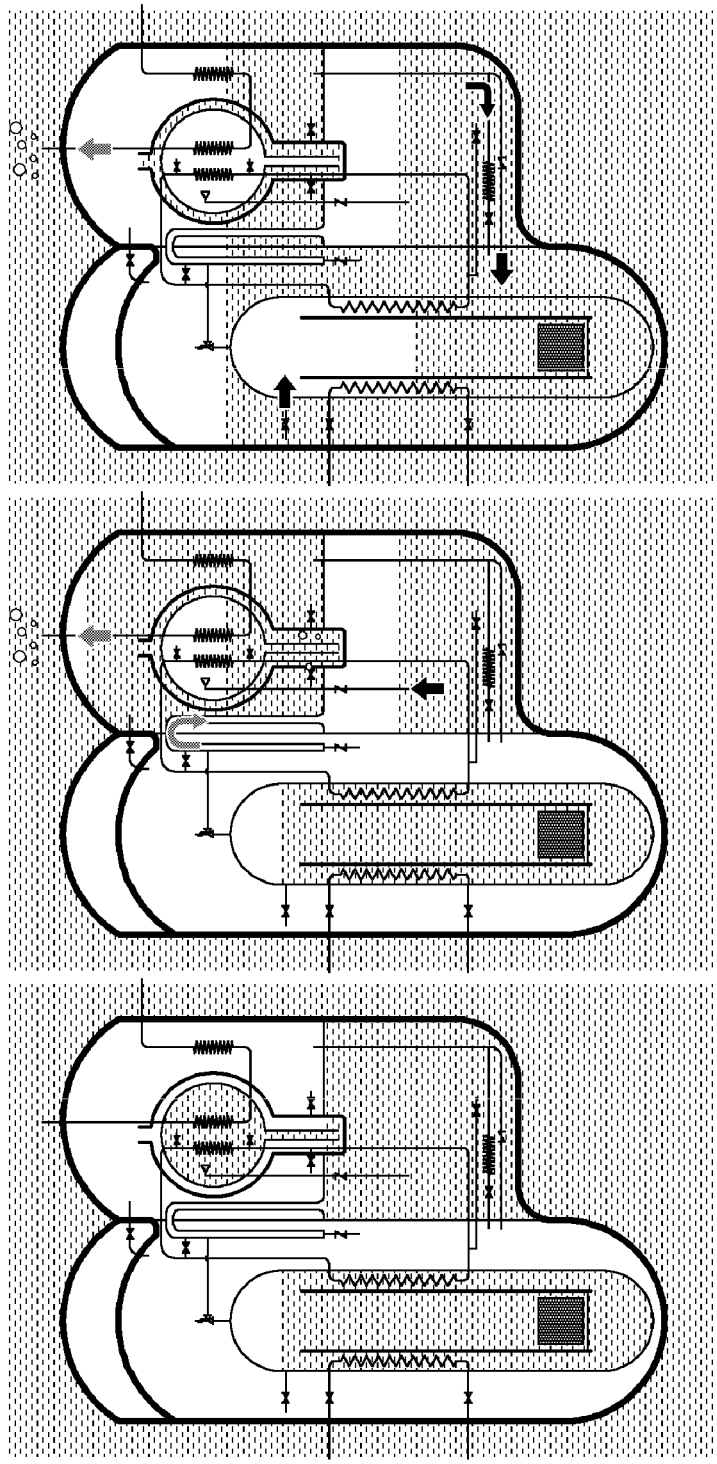
FIGS. 8A, 8B, and 8C are diagrams illustrating a method for operating a nuclear reactor according to an exemplary embodiment of the present invention.

The method of operating a nuclear reactor according to the exemplary embodiment of the present invention as illustrated in FIG. 7 having the above-described configuration will be described in detail step by step. FIGS. 8A, 8B and 8C illustrate each step of the method of operating a nuclear reactor according to the exemplary embodiment of the present invention illustrated in FIG. 7.

FIG. 8A illustrates a state in which the nuclear reactor is operating normally. That is, since overheat is not generated in the nuclear reactor driving system, all the heat generated from the nuclear reactor core 151 is used to evaporate the coolant in the steam generator 153 supplied to the water supply pipe 155. In addition, all of the steam in the steam generator 153 is discharged through the steam pipe 154 to rotate the external generator, thereby generating electric power. In this case, the nuclear reactor safety system does not operate and maintains the initial state. The initial state of the nuclear reactor safety system of the present invention is the state in which the coolant is filled in the third space V3 and the coolant is fully filled in the heat exchange vessel 134 in the residual heat removing portion 130 without any empty space.

Starting the operation of the nuclear reactor safety system means that the nuclear reactor driving system is abnormally operated due to the intentional stop of the nuclear reactor driving system, the accidents of the nuclear reactor, etc. That is, prior to starting the operation of the nuclear reactor safety system, isolating which includes stopping the nuclear reactor driving system; and closing the steam pipe isolation valve 154*v* included in the steam pipe 154 and the water supply pipe isolation valve 155*v* included in the water supply pipe 155 is always performed.

As described above, when the abnormal operation of the nuclear reactor occurs, overheat occurs in the nuclear reactor core 151. If the steam generator 153 and external devices (power generation devices) are isolated from each other, the coolant in the steam generator 153 and the nuclear reactor vessel 152 is evaporated rapidly. In addition, when the nuclear reactor vessel 152 is damaged and thus the coolant is leaked, the coolant leaked to the first space V1 is also evaporated rapidly, such that a large amount of steam is generated. Due to the change in pressure in the nuclear reactor driving system caused by the steam thus generated, the coolant in the nuclear reactor safety system starts to move. FIG. 8B illustrates the state in which the cooling of the nuclear reactor is being performed by moving the coolant in the nuclear reactor safety system due to the change in pressure in the nuclear reactor driving system as described above. The operation of the nuclear reactor safety system in the state as illustrated in FIG. 8 (B) includes a primary heat exchanger circulating step, a saturated steam pressure space forming step, a two-phase heat transfer step, and a residual heat removing step.

The primary heat exchanger circulating step is performed in the following order. First, the steam generated by evaporating the coolant in the nuclear reactor driving system is introduced into the primary heat exchanger 131. Next, the steam introduced into the primary heat exchanger 131 is condensed by passing through the primary heat exchanger 131 to generate a coolant, and the generated coolant is re-introduced into the nuclear reactor vessel 152 to be circulated. The exemplary embodiment of FIG. 7 illustrates that the primary heat exchanger 131 is connected to the steam generator 153 in the nuclear reactor driving system. That is, in this case, the steam in the steam generator 153 is introduced into the primary heat exchanger 153. Meanwhile, the channel connected to the primary heat exchanger 131 may be provided with a channel communicating with the nuclear reactor vessel 152 or the first space V1. In this case, not only the steam in the steam generator 153 but also the steam in the nuclear reactor vessel 152 or the steam in the first space V1 may also be distributed to the primary heat exchanger 131 to be cooled.

If high-temperature steam flows into the primary heat exchanger 131, the coolant around the primary heat exchanger 131 and the high-temperature steam exchange heat with each other, thereby primarily cooling down the steam. This corresponds to a cooling method in the conventional heat exchanger for removing residual heat as illustrated in FIG. 2. However, since the conventional method cannot sufficiently cool down a large amount of steam quickly, the present invention uses the two-phase heat transfer principle to cool down the steam (a two-phase heat transfer step). In addition, the device for forming the saturated steam pressure space (a saturated steam pressure space forming step) is configured to further maximize the two-phase heat transfer efficiency. These steps will be described as follows.

The saturated steam pressure space forming step is performed in the following order. First, as described in the primary heat exchanger circulating step, if steam is introduced into the primary heat exchanger 131, the coolant accommodated in the heat exchange vessel 134 exchanges heat with the steam introduced into the primary heat exchanger 131 to be heated and boiled (the steam continues to be cooled down even in the step). As described above, the steam generated by boiling the coolant around the primary heat exchanger 131 is formed in the bubble form and collected on the upper part of the heat exchange vessel 134 by the density difference. As the amount of bubbles to be collected increases over time, the bubbles eventually form the space having the saturated steam pressure in the upper part of the heat exchange vessel 134. As the time passes, the saturated steam pressure space in which the bubbles are collected extends to the position where the primary heat exchanger 131 and the secondary heat exchanger 132 are disposed. At this time, the primary heat exchanger 131 and the secondary heat exchanger 132 are disposed in the space in which the coolant steam is saturated, that is, there is no non-condensed gas in the space around the primary heat exchanger 131 and the secondary heat exchanger 132.

The two-phase heat transfer step is performed in the following order. The coolant supplied by the coolant spray pipe 133 is in contact with an outer surface of the primary heat exchanger 131 by being first sprayed to the outer surface while the saturated steam pressure space is formed as described above. Referring to item II of FIG. 5, the coolant spray pipe 133 corresponds to the nozzle of FIG. 5, and the primary heat exchanger 131 corresponds to the releasing tube of FIG. 5. Next, the coolant contacting the outer surface of the primary heat exchanger 131 absorbs the heat from the steam in the primary heat exchanger 131 to be evaporated and the steam in the primary heat exchanger 131 is condensed to generate the coolant. Next, the steam generated by being evaporated from the outer surface of the primary heat exchanger 131 is in contact with the outer surface of the secondary heat exchanger 132. Referring to item II of FIG. 5, the secondary heat exchanger 132 corresponds to the absorbing tube of FIG. 5. The steam contacting the outer surface of the secondary heat exchanger 132 discharges heat to the coolant in the secondary heat exchanger 132 to be condensed as the coolant, and the coolant in the secondary heat exchanger 132 is evaporated to generate steam.

As described above, in the nuclear reactor safety system of the present invention, since cooling is performed using the two-phase heat transfer principle, there is a great advantage that cooling can be performed much faster and more efficiently than the cooling by the conventional heat exchange principle. In addition, the present invention has the following advantages. In the heat transfer by the above-mentioned two-phase heat transfer principle, the higher the ratio of the non-condensed gas within the space, the lower the heat transfer efficiency becomes. As described above, the primary heat exchanger 131 and the secondary heat exchanger 132 are disposed within the space (that is, saturated steam pressure space) saturated with the coolant steam naturally formed by the saturated steam pressure forming step, such that the efficiency of the two-phase heat transfer is maximized.

The residual heat removing step is performed in the following order. The coolant in the secondary heat exchanger 132 exchanges heat with the steam passing through the primary heat exchanger 131 by the two-phase heat transfer principle, such that the coolant absorbs heat to become steam. Finally, the residual heat is removed by discarding the heat of the steam to the outside. Specifically, first, the steam in the secondary heat exchanger 132 is discharged to the outside or is introduced into an external separate heat exchanger. Next, the external coolant is introduced into the secondary heat exchanger 132 or the coolant generated by being condensed in the external separate heat exchanger is re-introduced and circulated, such that the residual heat can be removed. In addition, since the auxiliary secondary heat exchanger 132a provided in the third space V3 is further provided on the channel through which the coolant discharged from the secondary heat exchanger 132 flows (as will be described below in more detail), such that the cooling may be partially performed in advance before being discharged to the outside by the coolant filled in the third space V3 during the safety system driving process.

FIG. 3 or 7 illustrates the example in which the nuclear reactor according to the exemplary embodiment of the present invention is formed so that the first containment vessel 110 and the second containment vessel 120 are disposed under the surface of the water. That is, the nuclear reactor according to the exemplary embodiment of the present invention may be directly installed in a heat sink having heat capacity close to infinity, such as seawater or a water reservoir. In this case, an inlet and an outlet of the secondary heat exchanger 132 may be formed to be directly opened to the space filled with seawater or water of the water reservoir. Then, the steam in the secondary heat exchanger 132 is discharged in the form of bubbles through the discharge end, so that heat can be conveniently discarded. The seawater or the water of the water reservoir is introduced into the secondary heat exchanger 132 through an inlet as much as the steam is discharged from the secondary heat exchanger 132, thereby newly performing the heat exchange.

Although not illustrated in the drawings, the secondary heat exchanger 132 may be connected to the external separate heat exchanger as described above. At this time, the external separate heat exchanger is provided in the heat sink such as the seawater or the water reservoir.

In this case, the steam in the secondary heat exchanger 132 flows into the external separate heat exchanger through the discharge end and the separate heat exchanger discards heat to the heat sink, such that the steam is cooled to be condensed as the liquid-state coolant. The so condensed coolant is re-introduced through the inlet of the secondary heat exchanger 132 to be circulated, such that the residual heat may be removed.

Additionally, the nuclear reactor safety system may further include an auxiliary water supply pipe 116 to further perform a coolant auxiliary water supply step. More specifically, one end of the auxiliary water supply pipe 116 communicates with the lower part of the second space V2 and the other end thereof communicates with the steam generator 153, and an auxiliary water supply valve 116v is provided on the auxiliary water supply pipe 116. At this time, the coolant auxiliary water supply step has the process in which if the pressure of the second space V2 is higher than that in the steam generator 153, the auxiliary water supply valve 116v is open and thus the coolant in the second space V2 is supplied to the steam generator 153.

Further, in this case, the auxiliary steam release valve 131v may further be provided in the nuclear reactor safety system so that the auxiliary steam supply step to the saturated steam pressure space may be further performed. More specifically, the auxiliary steam release valve 131v is provided on the upper part of the primary heat exchanger 131 to auxiliary supply steam to the space having the saturated steam pressure in the heat exchange vessel 134. At this time, the auxiliary steam supply step to the saturated steam pressure space has the process in which if the coolant auxiliary supplied to the steam generator 153 by the coolant auxiliary water supply step is evaporated to generate steam, the auxiliary steam release valve 131v is open to supply the steam in the steam generator 153 to the heat exchange vessel 134 to further form the space having the saturated steam pressure. As described above, the steam is further supplied to the saturated steam pressure space, such that the two-phase heat transfer between the primary heat exchanger 131 and the secondary heat exchanger 132 can be performed more efficiently.

Meanwhile, in the nuclear reactor according to the exemplary embodiment of the present invention, the operation of introducing steam due to the overheat generated in the nuclear reactor driving system into the primary heat exchanger 131 and cooling down and condensing the steam by the two-phase heat transfer between the primary heat exchanger 131 and the secondary heat exchanger 132 by the spray of the coolant supplied through the coolant spray pipe 133 to return to the nuclear reactor driving system so as to perform the circulation is described. At this time, the coolant supplied through the coolant spray pipe 133 may be a coolant separately supplied from the outside. However, in order to more simplify the device configuration and operation and perform the complete passive operation without the separate control command, it is preferable that the operation of supplying the coolant through the coolant spray pipe 133 naturally takes place according to the change in the thermal hydraulic condition. In order to do so, the nuclear reactor safety system may further include a steam bypass pipe 114 and a Nuclear reactor vessel safety valve 157.

One end of the steam bypass pipe 114 is connected to a channel through which the coolant is introduced from the steam generator 153 in the nuclear reactor driving system to the primary heat exchanger 131 and the other end thereof is connected to the containment vessel through pipe 111. The steam bypass pipe 114 is provided with a steam bypass valve 114v. If there is no steam bypass pipe 114, all the coolant steam in the steam generator 153 is distributed to the primary heat exchanger 131 to be used for cooling. However, if the operation failure of the nuclear reactor occurs, the temperature in the nuclear reactor rises very sharply, and the evaporation rate of the coolant and the steam generation amount in the steam generator 153 increase accordingly, such that the pressure in the steam generator 153 and the primary heat exchanger 131 is highly likely to excessively increase. In this case, if the steam in the steam generator 153 is bypassed through the steam bypass pipe 114 to be distributed to the second space V2 through the containment vessel through pipe 111, the steam bypassed through the steam bypass pipe 114 serves to pressurize the pressure in the second space V2.

The Nuclear reactor vessel safety valve 157 is provided in the nuclear reactor vessel 152 as illustrated to discharge the steam in the nuclear reactor vessel 152 to the first space V1 or the containment vessel through pipe 111.

Hereinafter, a step of performing coolant pressurization spray in which the coolant is supplied to the coolant spray pipe 133 by the change in the thermal hydraulic condition will be described in detail. In other words, if the steam bypass pipe 114 and the Nuclear reactor vessel safety valve 157 are further provided as described above, the step of performing the coolant pressurization spray may be performed more smoothly. However, even when there are no steam bypass pipe 114 and nuclear reactor safety valve 157, there is no big problem in realizing the step of performing the coolant pressurization spray to be described below. That is, it is preferable that the steam bypass pipe 114 and the nuclear reactor safety valve 157 are provided. However, even if the steam bypass pipe 114 and the nuclear reactor safety valve 157 are not provided, there is no big problem in performing the step of performing the coolant pressurization spray.

The step of performing the coolant pressurization spray is performed in the following order. At first, the steam generated in the nuclear reactor driving system is introduced into the containment vessel through pipe 111 by at least one operation selected from the opening of the containment vessel through valve 111v, the opening of the steam bypass valve 114v, and the opening of the Nuclear reactor vessel safety valve 157. That is, even if the steam bypass pipe 114 or the nuclear reactor safety valve 157 is not provided, since the coolant leaked to the first space V1 is suddenly evaporated to sharply increase the pressure in the first space V1 when the coolant is leaked from the nuclear reactor vessel 152 to the first space V1, the containment vessel through valve 111v is naturally open by the pressure to make steam flow from the first space V1 into the second space V2 through the containment vessel through pipe 111 and make the steam pressurize the second space V2. At this time, the containment vessel through valve 111v is preferably a check valve type that permits only the flow from the first space V1 into the second space V2.

Meanwhile, even if the operation failure of the nuclear reactor occurs, when the coolant is not leaked from the nuclear reactor vessel 152 to the first space V1, the second space V2 is not pressurized without the steam bypass pipe 114 or the nuclear reactor safety valve 157. At this time, since the steam bypass pipe 114 is connected to the containment vessel through pipe 111, when the steam bypass pipe 114 is provided, the steam in the steam generator 153 is introduced into the second space V2 through the containment vessel through pipe 111 to smoothly pressurize the second space V2. In addition, since the nuclear reactor safety valve 157 is configured to discharge steam to the first space V1 or to discharge the steam to the containment vessel through pipe 111 as illustrated, when the steam is discharged to the first space V1, the steam flows into the second space V2 through the containment vessel through pipe 111 on the same principle as the leakage of the coolant and when the steam is discharged to the containment vessel through pipe 111, the steam naturally flows into the second space V2.

In this manner, if the steam is introduced into the containment vessel through pipe 111 by at least one operation selected from the opening of the containment vessel through valve 111v, the opening of the steam bypass valve 114v, and the opening of the Nuclear reactor vessel safety valve 157, the coolant in the second space V2 is introduced into the coolant spray pipe 133 by the pressurization due to the steam introduced through the containment vessel through pipe 111. As described above, if the coolant is introduced into the coolant spray pipe 133, the coolant spray valve 133v is opened by the pressure and thus the coolant is sprayed to the primary heat exchanger 131 and the secondary heat exchanger 132 through the coolant spray pipe 133, such that the above-described step of performing the two-phase heat transfer is performed.

As described above, the coolant supplied to the coolant spray pipe 133 is not necessarily the coolant accommodated in any place of the nuclear reactor safety system, and therefore the supply operation of the coolant may be performed according to a separate control command. However, according to the exemplary embodiment of the present invention, in particular, when the step of performing the coolant pressurization spray is performed, the coolant supplied to the coolant spray pipe 133 is the coolant accommodated in the second space V2. In addition, the supply operation takes place due to the change in pressure in the nuclear reactor driving system which occurs due to the overheat of the nuclear reactor. That is, in this case, no separate coolant supply or active control commands are required, which makes the operation convenient and the immediate accident-handling response much better.

As described above, the nuclear reactor according to the exemplary embodiment of the present invention normally maintains the state as illustrated in FIG. 8A, but when the nuclear reactor overheats, the state changes to the state as illustrated in FIG. 8B, such that the cooling of the nuclear reactor driving system is made by the natural movement of the coolant in response to the change in pressure and thermal hydraulic condition. More specifically, the coolant moves to the residual heat removing device 130 in the third space V3 in the steam state, thereby discarding the heat of the first space V1, and the coolant in the second space V2 moves to the third space V3 so that the heat transfer can be smoothly performed.

In this manner, the coolant in the second space V2 continues to move to the third space V3 to perform the cooling. As time passes, all the coolant in the second space V2 eventually moves to the third space V3. At this time, in order to prevent the cooling operation from being interrupted, in the nuclear reactor according to the exemplary embodiment of the present invention, another movement of the coolant takes place before the coolant reaches the state, and in this process, the direct cooling of the nuclear reactor driving system is further performed. FIG. 8C illustrates the state in which such the nuclear reactor driving system is directly cooled.

The step of directly cooling down the coolant is performed in the following order. First, the coolant generated by condensing the steam on the surface of the secondary heat exchanger 132 by the step of performing the two-phase heat transfer is discharged to the third space V3 through the coolant flow path 134a and is accommodated therein (as the space filled with saturated steam is formed on the upper part of the heat exchange vessel 134 in the step of forming the saturated steam pressure space, it is natural that the coolant pushed as much as the volume is also discharged together through the coolant flow path 134a). That is, the coolant introduced into the heat exchange vessel 134 through the coolant spray pipe 133 is used for the two-phase heat transfer while being evaporated and condensed, and then finally condensed to be filled in the third space V3 as the liquid-state coolant state.

In this manner, if the water level of the coolant in the third space V3 rises while the coolant is filled in the third space V3, the pressure of the empty space in the third space V3 gradually increases. That is, in the early stage of the occurrence of overheating of the nuclear reactor, the pressure of the first space V1 is highest and the pressure of the third space V3 is in a relatively low state. However, as the nuclear reactor is cooled down over time, the pressure of the first space V1 gradually decreases and the pressure in the third space V3 gradually increases due to the increase in the water level of the coolant in the third space V3.

In addition, the nuclear reactor safety system may further include a steam release pipe 113 having one end communicating with the upper part of the first space V1 and the other end communicating with the upper part of the third space. The steam release pipe 113 is provided with a steam release valve 113v and distributes the steam in the first space V1 to the third space V3 to pressurize the pressure in the third space V3 when the steam release valve 113v is open. That is, when the pressure in the first space V1 increases, the steam release valve 113v is open. Then, some of the steam in the first space V1 is directly introduced into the third space V3, which serves to increase the pressure of the third space V3 while lowering the pressure of the first space V1. When the above process continues, the pressure in the first space V1 and the pressure in the third space V3 are balanced when it reaches a critical point.

In this manner, if the pressure in the first space V1 and the pressure in the third space V3 are balanced, the water head difference in coolant in the third space V3 at a relatively higher position as compared to the first space at a relatively lower position becomes the operation generation factor. That is, in this state, the coolant injection valve 112v is open by the water head difference between the first space V1 and the third space V3, such that the coolant accommodated in the third space V3 is introduced into the coolant injection pipe 112. In this manner, the coolant introduced into the first space V1 through the coolant injection pipe 112 directly contacts the nuclear reactor vessel 152 to perform the cooling as illustrated in FIG. 8C.

In order for the coolant to be introduced into the first space V1 from the third space V3 as described above, the higher the water level of the coolant in the third space V3, the more advantageous it is. For this purpose, in the nuclear reactor safety system, the lower part of the heat exchange vessel outer cylinder 135 is provided with a heat exchange vessel outer cylinder valve 135v to release the coolant filled in the heat exchange vessel outer cylinder 135 so that the heat exchange vessel outer cylinder 135 can serve as a siphon. As a result, it is preferable to better perform a step of adjusting a water level of a coolant.

At this time, the step of adjusting the water level of the coolant may be performed in the following order. First, the coolant is filled in the heat exchange vessel outer cylinder 135 by the step of directly cooling down the coolant, and thus the water level rises. At this time, if the heat exchange vessel outer cylinder valve 135c is open, the coolant filled in the heat exchange vessel outer cylinder 135 is discharged to the third space V3 by the siphon principle until the water level between the third space V3 and the heat exchange vessel outer cylinder 135 becomes equal. As a result, the coolant may be a little more filled in the third space V3. Accordingly, it is possible to further increase the water head difference between the third space and the first space which leads to induce the step of directly cooling down the coolant. That is, as a result, the step of directly cooling down the coolant can be performed more smoothly by the step of adjusting the water level of the coolant.

That is, the coolant in the nuclear reactor driving system is in the state as illustrated in FIG. 8B in the early stage of the occurrence of overheating of the nuclear reactor and thus moves to the residual heat removing device 130, such that the coolant discards heat by the two-phase heat transfer and returns to the nuclear reactor driving system to be circulated, thereby performing the indirect cooling, and after a certain period of time elapses, the coolant is in the state as illustrated in FIG. 8C, such that the coolant comes into direct contact with the outer surface of the nuclear reactor vessel 152, thereby performing the direct cooling.

In this manner, if the coolant comes into direct contact with the outer surface of the nuclear reactor vessel 152, the coolant is evaporated by absorbing heat from the nuclear reactor vessel 152. As the steam is filled in the first space V1, the pressure in the first space V1 rises again. As described above, if the pressure in the first space V1 and the pressure in the third space V3 are balanced, the coolant that has been filled in the third space V3 flows into the first space V1. In this manner, the coolant in the third space V3 flows into the first space V1 and thus if the pressure in the first space V1 rises again while the water head difference decreases, the step of directly cooling down the coolant naturally stops. In addition, the coolant that has been filled in the second space V2 during the process moves to the third space V3 (during the indirect cooling process) and the first space V1 (during the direct cooling process) in order, such that the water level of the coolant drops but the water level of the coolant in the first space V1 rises. Therefore, after any critical point, the coolant in the first space V1 flows into the second space V2 through the containment vessel through pipe 111 by the water head difference in coolant between the first space V1 and the second space V2, such that the second space V2 is again filled to some extent.

This state is a state approaching the initial state of the occurrence of overheating of the nuclear reactor. Therefore, the coolant in the second space V2 is supplied to the residual heat removing device 130 through the coolant spray pipe 133 by the pressure in the first space V1, and the process of indirectly cooling down the nuclear reactor driving system by the two-phase heat transfer between the primary heat exchanger 131 and the secondary heat exchanger 132 using the supplied coolant, that is, the process of FIG. 8B is repeated. As the process of FIG. 8B proceeds, the process of directly cooling down the coolant is again performed if the cooling state again approaches the condition of FIG. 8C, and the processes of FIGS. 8B and 8C are repeatedly performed alternately, such that the overheat generated in the nuclear reactor can be completely removed depending on the change in the pressure and thermal hydraulic conditions.

Meanwhile, the nuclear reactor safety system may further include a containment vessel depressurization pipe 115 to prevent the first space V1 from being over-pressurized during the process. The containment vessel depressurization pipe 115 has one end communicating with the lower part of the first space V1 and the other end communicating with the coolant injection pipe 112 and is provided with a containment vessel depressurization valve 115v. The containment vessel depressurization pipe 115 serves to distribute the steam in the first space V1 to the coolant injection pipe 112 so as to reduce the pressure in the first space V1. At this time, the method for operating a nuclear reactor may further include a step of depressurizing a containment vessel.

The step of depressurizing a containment vessel is performed in the following order. After the step of directly cooling down the coolant, the coolant that is introduced into the first space V1 and is in direct contact with the nuclear reactor vessel 152 is evaporated by absorbing heat from the nuclear reactor vessel 152 to generate steam. The steam generated by absorbing heat from the nuclear reactor vessel 152 is filled in the first space V1 and thus the pressure in the first space V1 rises. Then, the containment vessel depressurization valve 115v is open by the pressure to introduce the steam in the first space V1 into the coolant injection pipe 112 through the containment vessel depressurization pipe 115, such that the overpressure in the first space V1 can be reduced.

In the process, the containment vessel depressurization pipe heat exchanger 115a may be further provided on the containment vessel depressurization pipe 115. In this case, the steam in the first space V1 may be previously cooled down while passing through the containment vessel depressurization pipe heat exchanger 115a and may be introduced into the coolant injection pipe 112. As a result, the coolant in the coolant injection pipe 112 again flows into the first space V1 and comes into direct contact with the lower part of the nuclear reactor vessel 152 to perform the direct cooling. In this manner, it is more preferable to previously cool down the steam by providing the containment vessel depressurization pipe heat exchanger 115a on the containment vessel depressurization pipe 115.

In addition, the nuclear reactor vessel 152 may further include a coolant supplement pipe 156 for supplementing a coolant. In the cooling process as described above, the coolant in the nuclear reactor vessel 152 is leaked from the nuclear reactor vessel 152 and then circulated through various devices within the nuclear reactor safety system for the cooling operation. In other words, the coolant in the nuclear reactor vessel 152 eventually decreases gradually. The coolant supplement pipe 156 is connected to the nuclear reactor vessel 152 and supplied with a coolant from the outside to supplement and supply the coolant into the nuclear reactor vessel 152. That is, if the coolant supplement pipe 156 is provided, a step of supplementing a coolant for supplementing the coolant supplied through the coolant supplement pipe 156 from the outside into the nuclear reactor vessel 152 may be performed.

In addition, the nuclear reactor driving system further includes a first circulation valve 136v1 and a second circulation valve 136v2 to further supply the coolant to the steam generator 153, such that the coolant may be more smoothly circulated in the nuclear reactor. More specifically, the first circulation valve 136v1 and the second circulation valve 136v2 are provided on the channel under the primary heat exchanger 131. Among those, the first circulation valve 136v1 is disposed inside the heat exchange vessel 134, and the second circulation valve 136v2 is disposed outside the heat exchange vessel 134. In this case, if the first circulation valve 136v1 and the second circulation valve 136v2 are open, a step of supplementing a coolant into a steam generator for supplementing the coolant supplied from the third space V3 through the first circulation valve 136v1 and the second circulation valve 136v2 to the steam generator 153 may be performed, such that the coolant in the nuclear reactor may be more smoothly circulated.

The present invention is not limited to the above-mentioned embodiments but may be variously applied, and may be variously modified by those skilled in the art to which the present invention pertains without departing from the gist of the present invention claimed in the claims.

INDUSTRIAL APPLICABILITY

According to the present invention, it is possible to greatly save resources such as time, manpower, and cost required for design, construction, operation, control or the like, and greatly enhance economical efficiency of the operation and construction of the nuclear reactor.

The invention claimed is:
1. A self-diagnosis and accident-handling unmanned nuclear reactor, comprising:
a nuclear reactor driving system configured to include a nuclear reactor vessel accommodating a nuclear reactor core and a steam generator to which a steam pipe and a water supply pipe are connected; and
a nuclear reactor safety system comprising:
a first containment vessel that accommodates gas and the nuclear reactor driving system in a first space therein;
a second containment vessel that is disposed adjacent to the first containment vessel and includes a horizontal barrier provided therein to divide an inner space into a lower second space and an upper third space so as to accommodate coolant in the second space;
a containment vessel through pipe that has a first end disposed in the first space and a second end communicating with the second space and includes a containment vessel through valve;
a coolant injection pipe that has a first end disposed in the third space and a second end communicating with the first space and includes a coolant injection valve; and
a residual heat removing device positioned in the third space and connected to the nuclear reactor driving system to transfer heat released from the nuclear reactor driving system to the coolant and transfer the heat absorbed into the coolant to an external heat sink outside of the nuclear reactor,
wherein the residual heat removing device comprises:
a heat exchange portion that transfers heat by a two-phase heat transfer mechanism using the coolant supplied by a flow path connected to the second space, the heat exchange portion comprising:
a primary heat exchanger connected to the nuclear reactor driving system to distribute the coolant in the nuclear reactor driving system to radiate heat;
a secondary heat exchanger positioned adjacent to the primary heat exchanger to distribute the coolant for absorbing residual heat to absorb the heat; and
a coolant spray pipe connected to the second space to spray the coolant to the primary heat exchanger;
a heat exchange vessel comprising an airtight container portion that has the coolant accommodated therein and the heat exchange portion accommodated in an upper part thereof, the heat exchange vessel including the flow path extending from a lower part of the heat exchange vessel to the second space opened to distribute the coolant; and
a heat exchange vessel outer cylinder surrounding the airtight container portion to secure a water level of the coolant at which a lower end of the flow path is immersed in the coolant to accommodate and distribute the coolant,
wherein a space having a saturated steam pressure is formed at the upper part of the heat exchange vessel where the heat exchange portion is positioned, the saturated steam pressure caused by coolant steam generated by the coolant being boiled by the primary heat exchanger of the heat exchange portion; and
wherein the coolant supplied by the coolant spray pipe on the space having the saturated steam pressure is sprayed to the primary heat exchanger and the secondary heat exchanger to cause heat transfer via the two-phase heat transfer mechanism.

2. The self-diagnosis and accident-handling unmanned nuclear reactor of claim 1, wherein the nuclear reactor safety system further includes an auxiliary water supply pipe that has a first end communicating with a lower part of the second space and a second end communicating with the steam generator and supplies the coolant in the second space to the steam generator if a pressure in the second space is higher than that in the steam generator and includes an auxiliary water supply valve.

3. The self-diagnosis and accident-handling unmanned nuclear reactor of claim 2, wherein the nuclear reactor safety system further includes an auxiliary steam release valve that is provided on an upper part of the primary heat exchanger and is opened simultaneously with the opening of the auxiliary water supply valve to supply steam to the heat exchange vessel so that the steam is auxiliarily supplied to the space having the saturated steam pressure within the heat exchange vessel.

4. The self-diagnosis and accident-handling unmanned nuclear reactor of claim 1, wherein the nuclear reactor safety system further includes a steam release pipe that has one end communicating with an upper part of the first space and the other end communicating with an upper part of the third space to distribute the steam in the first space to the third space to generate a pressure in the third space and includes a steam release valve.

5. The self-diagnosis and accident-handling unmanned nuclear reactor of claim 1, wherein the nuclear reactor safety system further includes a steam bypass pipe that has a first end connected to a channel through which the coolant is introduced into the primary heat exchanger from the steam generator within the nuclear reactor driving system and a second end connected to the containment vessel through pipe to bypass the steam in the steam generator through the containment vessel through pipe to distribute the steam to the second space so that a pressure in the second space is generated, and includes a steam bypass valve.

6. The self-diagnosis and accident-handling unmanned nuclear reactor of claim 1, wherein the heat exchange vessel outer cylinder has a shape corresponding to the heat exchange vessel and is formed and disposed to be larger than the heat exchange vessel so that an inner wall of the heat exchange vessel outer cylinder and an outer wall of the heat exchange vessel are spaced apart from each other at a predetermined interval, and wherein the heat exchange vessel outer cylinder has an upper part opened to the third space and a lower part closed to distribute the coolant to the upper part thereof.

7. The self-diagnosis and accident-handling unmanned nuclear reactor of claim 6, wherein the heat exchange vessel outer cylinder has a heat exchange vessel outer cylinder valve provided at a lower part thereof to release the coolant filled in the heat exchange vessel outer cylinder so that the heat exchange vessel outer cylinder serves as a siphon.

8. The self-diagnosis and accident-handling unmanned nuclear reactor of claim 1, wherein the nuclear reactor safety system further includes a containment vessel depressurization pipe that has a first end communicating with a lower part of the first space and a second end communicating with the coolant injection pipe to distribute the steam in the first space to the coolant injection pipe so that the pressure in the first space is depressurized, and includes a containment vessel depressurization valve.

9. The self-diagnosis and accident-handling unmanned nuclear reactor of claim 1, wherein the nuclear reactor driving system further includes a coolant supplement pipe that is connected to the nuclear reactor vessel to be supplied with the coolant from the outside to supplement the coolant into the nuclear reactor vessel.

10. The self-diagnosis and accident-handling unmanned nuclear reactor of claim 1, wherein the nuclear reactor driving system further includes a first circulation valve disposed inside the heat exchange vessel and a second circulation valve disposed outside the heat exchange vessel that are provided on a channel of a lower part of the primary heat exchanger to further supply the coolant in the third space to the steam generator.

11. The self-diagnosis and accident-handling unmanned nuclear reactor of claim 1, wherein the nuclear reactor driving system further includes a nuclear reactor vessel safety valve that is provided in the nuclear reactor vessel to release the steam in the nuclear reactor vessel to the first space or to the containment vessel through a pipe.

12. The self-diagnosis and accident-handling unmanned nuclear reactor of claim 1, wherein the nuclear reactor is formed so that the first containment vessel and the second containment vessel are disposed under a surface of water.

\* \* \* \* \*